United States Patent
Kim et al.

(10) Patent No.: US 8,442,044 B2
(45) Date of Patent: *May 14, 2013

(54) DIGITAL BROADCASTING SYSTEM AND METHOD OF PROCESSING DATA

(75) Inventors: Byoung Gill Kim, Seoul (KR); In Hwan Choi, Gyeonggi-do (KR); Jin Woo Kim, Seoul (KR); Jong Moon Kim, Gyeonggi-do (KR); Won Gyu Song, Seoul (KR); Hyoung Gon Lee, Seoul (KR); Kook Yeon Kwak, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 257 days.

This patent is subject to a terminal disclaimer.

(21) Appl. No.: 12/843,775

(22) Filed: Jul. 26, 2010

(65) Prior Publication Data

US 2010/0290460 A1    Nov. 18, 2010

Related U.S. Application Data

(63) Continuation of application No. 12/027,195, filed on Feb. 6, 2008, now Pat. No. 7,792,103.

(60) Provisional application No. 60/889,245, filed on Feb. 9, 2007.

(30) Foreign Application Priority Data

Apr. 13, 2007 (KR) .......................... 10-2007-0036610

(51) Int. Cl.
*H04J 3/04* (2006.01)
*H04N 7/12* (2006.01)

(52) U.S. Cl.
USPC ................ 370/389; 370/535; 375/240.01

(58) Field of Classification Search .................... None
See application file for complete search history.

(56) References Cited

U.S. PATENT DOCUMENTS

| | | | |
|---|---|---|---|
| 6,993,021 B1 | 1/2006 | Chuah et al. | |
| 7,400,820 B2 | 7/2008 | Uchida et al. | |
| 7,826,498 B2 | 11/2010 | Choi et al. | |
| 2002/0046406 A1 | 4/2002 | Chelehmal et al. | |
| 2003/0046431 A1 | 3/2003 | Belleguie | |
| 2004/0022278 A1 | 2/2004 | Thomas et al. | |
| 2004/0181800 A1 | 9/2004 | Rakib et al. | |
| 2006/0146797 A1 | 7/2006 | Lebizay | |
| 2006/0244865 A1 | 11/2006 | Simon | |
| 2007/0183525 A1 | 8/2007 | Park et al. | |
| 2007/0195889 A1 | 8/2007 | Hong et al. | |
| 2007/0198876 A1 | 8/2007 | Park et al. | |
| 2007/0230460 A1* | 10/2007 | Jeong et al. ................. 370/389 |
| 2008/0159279 A1 | 7/2008 | Younis et al. | |

* cited by examiner

*Primary Examiner* — Marcus R Smith
(74) *Attorney, Agent, or Firm* — Lee, Hong, Degerman, Kang & Waimey

(57) ABSTRACT

A digital broadcasting system and a method of processing data are disclosed. Herein, additional encoding is performed on mobile service data, which are then transmitted, thereby providing robustness in the processed mobile service data, so that the mobile service data can respond more strongly against fast and frequent channel changes. The method of processing data in a transmitting system includes receiving mobile service data, encapsulating the received mobile service data to a transport stream (TS) packet, and outputting the encapsulated mobile service data as a mobile service data packet, and multiplexing a main service data packet including main service data and the encapsulated mobile service data packet, thereby transmitting the multiplexed data packets to at least one transmitter located in a remote site.

8 Claims, 11 Drawing Sheets

FIG. 3

| Syntax | No. of bits | Format |
|---|---|---|
| Transport_packet( ) { | | |
|     sync_byte | 8 | bslbf |
|     transport_error_indicator | 1 | bslbf |
|     payload_unit_start_indicator | 1 | bslbf |
|     transport_priority | 1 | bslbf |
|     PID | 13 | uimsbf |
|     transport_scrambling_control | 2 | bslbf |
|     adaptation_field_control | 2 | bslbf |
|     continuity_counter | 4 | uimsbf |
|     if(adaptation_field_control==10\|\|adaptation_field_control==11){ | | |
|         adaptation_field() | | |
|     } | | |
|     if(adaptation_field_control==01\|\|adaptation_field_control==11){ | | |
|         for (i=0;i<N1;i++) { | | |
|             Mobile_service_data() | 8 | bslbf |
|         } | | |
|     } | | |
| } | | |

FIG. 4

| Syntax | No. of bits | Format |
|---|---|---|
| Mobile_service_data() { <br>    Mobile_service_data_length <br>    Tx_parameter() <br>    for(i=0; i<N2; i++) { <br>        Mobile_service_data_payloads <br>    } <br>} | 8<br><br><br><br>8 | uimsbf<br><br><br><br>bslbf |

FIG. 5

| Syntax | No. of bits | Format |
|---|---|---|
| Tx_parameter( ) { | | |
|     tx_parameter_length | 8 | uimsbf |
|     service_id | 4 | uimsbf |
|     super_frame_size | 4 | uimsbf |
|     reserved | 2 | bslbf |
|     burst_size | 6 | uimsbf |
|     burst_period | 8 | uimsbf |
|     reserved | 1 | bslbf |
|     rs_code_mode | 4 | bslbf |
|     turbo_code_mode | 3 | bslbf |
|     for (i=0;i<tx_parameter_length-5;i++) { <br>        additional_parameter() <br>    } <br>} | 8 | bslbf |

FIG. 6

| RS Code Mode for Region A/B | "00" | "01" | "10" | "11" |
|---|---|---|---|---|
| RS Code | (199,187) | (211,187) | (223,187) | (235,187) |
| # of parity (P) | 12 | 24 | 36 | 48 |

FIG. 7

| RS Code Mode for Region C | "00" | "01" | "10" | "11" |
|---|---|---|---|---|
| RS Code | (199,187) | (211,187) | (223,187) | (235,187) |
| # of parity (P) | 12 | 24 | 36 | 48 |

FIG. 8

| Turbo Code Mode | Outer code rate of Turbo Code | | |
|---|---|---|---|
| | Region A | Region B | Region C |
| "000" | 1/2 | 1/2 | 1/2 |
| "001" | 1/2 | 1/2 | 1/4 |
| "010" | 1/2 | 1/4 | 1/2 |
| "011" | 1/2 | 1/4 | 1/4 |
| "100" | 1/4 | 1/4 | 1/2 |
| "101" | 1/4 | 1/4 | 1/4 |
| "110" "111" | reserved | reserved | reserved |

FIG. 9

| Syntax | No. of bits | Format |
|---|---|---|
| OM_packet() { \ \ \ \ OM_type \ \ \ \ Mobile_service_data() } | 8 \ 8*N | bslbf \ bslbf |

DIGITAL BROADCASTING SYSTEM AND METHOD OF PROCESSING DATA

CROSS-REFERENCE TO RELATED APPLICATIONS

This application is a continuation of U.S. application Ser. No. 12/027,195 filed on Feb. 6, 2008, now U.S. Pat. No. 7,792,103, which claims the benefit of earlier filing date and right of priority to Korean Patent Application No. 10-2007-0036610, filed on Apr. 13, 2007, and the benefit of U.S. Provisional Application No. 60/889,245, filed on Feb. 9, 2007, the contents of all of which are hereby incorporated by reference herein in their entireties.

BACKGROUND OF THE INVENTION

1. Field of the Invention

The present invention relates to a digital broadcasting system and a method of processing data.

2. Discussion of the Related Art

The Vestigial Sideband (VSB) transmission mode, which is adopted as the standard for digital broadcasting in North America and the Republic of Korea, is a system using a single carrier method. Therefore, the receiving performance of the receiving system may be deteriorated in a poor channel environment. Particularly, since resistance to changes in channels and noise is more highly required when using portable and/or mobile broadcast receivers, the receiving performance may be even more deteriorated when transmitting mobile service data by the VSB transmission mode.

SUMMARY OF THE INVENTION

Accordingly, the present invention is directed to a digital broadcasting system and a method of processing data that substantially obviate one or more problems due to limitations and disadvantages of the related art.

An object of the present invention is to provide a digital broadcasting system and a method of processing data that are highly resistant to channel changes and noise.

Another object of the present invention is to provide a digital broadcasting system and a method of processing data that can enhance the receiving performance by performing additional encoding on mobile service data and by transmitting the processed data to the receiving system.

A further object of the present invention is to provide a digital broadcasting system and a method of processing data that can encapsulate non-transport-stream (TS) packet format mobile service data to a TS packet format, thereby enabling the mobile service data to maintain backward compatibility with the conventional digital broadcasting system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of processing data in a transmitting system includes receiving mobile service data, encapsulating the received mobile service data to a transport stream (TS) packet, and outputting the encapsulated mobile service data as a mobile service data packet, and multiplexing a main service data packet including main service data and the encapsulated mobile service data packet, thereby transmitting the multiplexed data packets to at least one transmitter located in a remote site. Herein, the step of encapsulating the received mobile service data to a transport stream (TS) packet may include encapsulating the inputted mobile service data to an addressable section format, when the inputted mobile service data correspond to an IP format, and generating a mobile service data packet in predetermined units, the generated mobile service data packet including the encapsulated section format mobile service data.

Also, the step of encapsulating the received mobile service data to a transport stream (TS) packet may include inserting transmission parameters including service-related information of the mobile service data in a specific region within the mobile service data packet. Herein, null data may be inserted in a specific region within the mobile service data packet.

In another aspect of the present invention, a method of processing data in a transmitting system includes inserting inputted mobile service data in at least a portion of a payload region within an operations and maintenance (OM) packet and outputting the processed OM packet, and multiplexing a main service data packet including main service data and the OM packet, thereby transmitting the multiplexed data packets to at least one transmitter located in a remote site. Herein, the step of outputting the OM packet may include inserting transmission parameters including service-related information of the mobile service data in at least a portion of a payload within the OM packet. Also, the step of outputting the OM packet may further include inserting null data in at least a portion of a payload within the OM packet.

In another aspect of the present invention, a service multiplexer of a transmitting system includes a packet encapsulator and a transport multiplexer. Herein, the packet encapsulator receives mobile service data, encapsulates the received mobile service data to a transport stream (TS) packet, and outputs the encapsulated mobile service data as a mobile service data packet. And, the transport multiplexer multiplexes a main service data packet including main service data and the encapsulated mobile service data packet, thereby transmitting the multiplexed data packets to at least one transmitter located in a remote site.

In a further aspect of the present invention, a service multiplexer of a transmitting system includes a packet encapsulator and a transport multiplexer. Herein, the packet encapsulator inserts inputted mobile service data in at least a portion of a payload region within an operations and maintenance (OM) packet and outputs the processed OM packet as a mobile service data packet. And, the transport multiplexer multiplexes a main service data packet including main service data and the mobile service data packet, thereby transmitting the multiplexed data packets to at least one transmitter located in a remote site.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 illustrates an example of a syntax structure for a mobile service data packet encapsulated to a TS packet format by a TS packet encapsulator shown in FIG. 2;

FIG. 4 illustrates an example of a syntax structure for a Mobile_service_data( ) field according to the present invention;

FIG. 5 illustrates an example of a syntax structure for a Tx_parameter( ) field according to the present invention;

FIG. 6 and FIG. 7 respectively illustrate examples of RS code mode within a transport parameter according to the present invention;

FIG. 8 illustrates an example of a turbo code mode within a transport parameter according to the present invention;

FIG. 9 illustrates an example of an OM packet syntax structure according to the present invention;

DETAILED DESCRIPTION OF THE INVENTION

Figure 1:
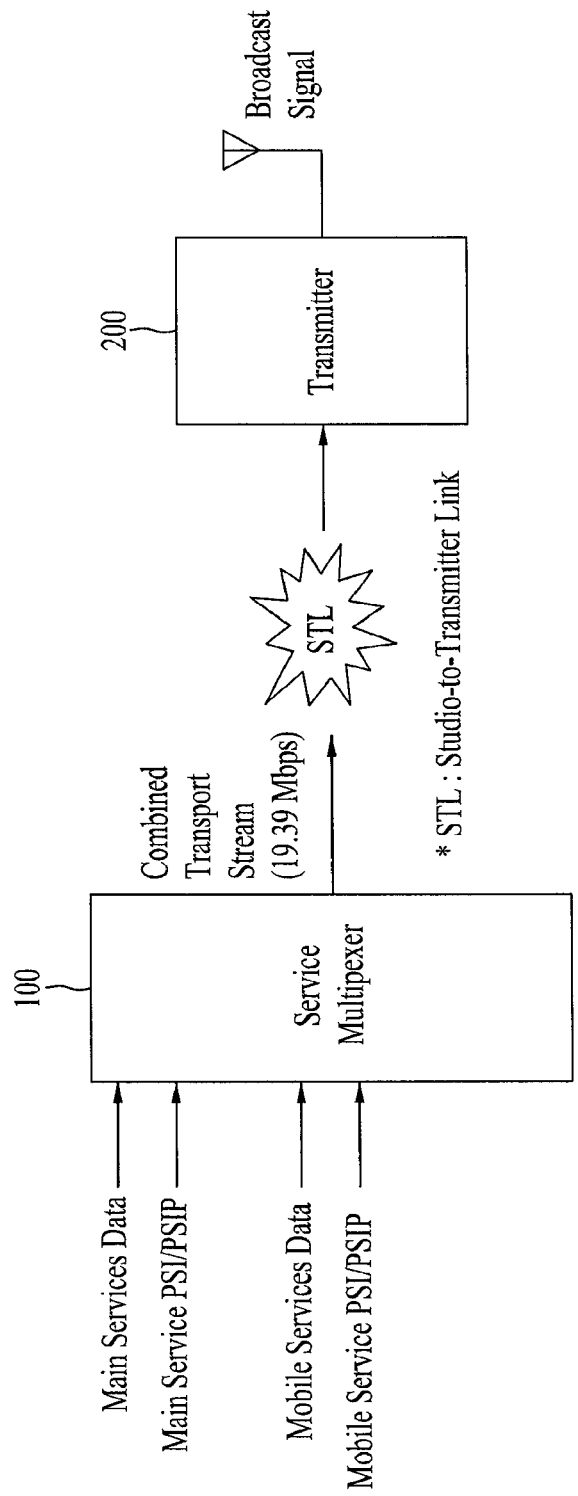
FIG. 1 illustrates a block diagram showing a general structure of a transmitting system according to an embodiment of the present invention.

Reference will now be made in detail to the preferred embodiments of the present invention, examples of which are illustrated in the accompanying drawings. Wherever possible, the same reference numbers will be used throughout the drawings to refer to the same or like parts. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

Among the terms used in the description of the present invention, main service data correspond to data that can be received by a fixed receiving system and may include audio/video (A/V) data. More specifically, the main service data may include A/V data of high definition (HD) or standard definition (SD) levels and may also include diverse data types required for data broadcasting. Also, the known data correspond to data pre-known in accordance with a pre-arranged agreement between the receiving system and the transmitting system. Additionally, in the present invention, mobile service data may include at least one of mobile service data, pedestrian service data, and handheld service data, and are collectively referred to as mobile service data for simplicity. Herein, the mobile service data not only correspond to mobile/pedestrian/handheld service data (M/P/H service data) but may also include any type of service data with mobile or portable characteristics. Therefore, the mobile service data according to the present invention are not limited only to the M/P/H service data.

The above-described mobile service data may correspond to data having information, such as program execution files, stock information, and so on, and may also correspond to A/V data. Most particularly, the mobile service data may correspond to A/V data having lower resolution and lower data rate as compared to the main service data. For example, if an A/V codec that is used for a conventional main service corresponds to a MPEG-2 codec, a MPEG-4 advanced video coding (AVC) or scalable video coding (SVC) having better image compression efficiency may be used as the A/V codec for the mobile service. Furthermore, any type of data may be transmitted as the mobile service data. For example, transport protocol expert group (TPEG) data for broadcasting real-time transportation information may be serviced as the main service data.

Also, a data service using the mobile service data may include weather forecast services, traffic information services, stock information services, viewer participation quiz programs, real-time polls and surveys, interactive education broadcast programs, gaming services, services providing information on synopsis, character, background music, and filming sites of soap operas or series, services providing information on past match scores and player profiles and achievements, and services providing information on product information and programs classified by service, medium, time, and theme enabling purchase orders to be processed. Herein, the present invention is not limited only to the services mentioned above. In the present invention, the transmitting system provides backward compatibility in the main service data so as to be received by the conventional receiving system. Herein, the main service data and the mobile service data are multiplexed to the same physical channel and then transmitted.

Particularly, the present invention uses a transport multiplexer used in a conventional digital broadcasting system so as to multiplex the mobile service data. Additionally, the transmitting system according to the present invention encapsulates non-transport-stream (TS) packet mobile service data (i.e., mobile service data that are not in TS packet formats) into TS packet formats, thereby outputting the encapsulated data. Furthermore, the transmitting system according to the present invention performs additional encoding on the mobile service data and inserts the data already known by the receiving system and transmitting system (e.g., known data), thereby transmitting the processed data. Therefore, when using the transmitting system according to the present invention, the receiving system may receive the mobile service data during a mobile state and may also receive the mobile service data with stability despite various distortion and noise occurring within the channel.

FIG. 1 illustrates a block diagram showing a general structure of a transmitting system according to an embodiment of the present invention. Herein, the transmitting includes a service multiplexer 100 and a transmitter 200. Herein, the service multiplexer 100 is located in the studio of each broadcast station, and the transmitter 200 is located in a site placed at a predetermined distance from the studio. The transmitter 200 may be located in a plurality of different locations. Also, for example, the plurality of transmitters may share the same frequency. And, in this case, the plurality of transmitters receives the same signal. Accordingly, in the receiving system, a channel equalizer may compensate signal distortion, which is caused by a reflected wave, so as to recover the original signal. In another example, the plurality of transmitters may have different frequencies with respect to the same channel.

A variety of methods may be used for data communication each of the transmitters, which are located in remote positions, and the service multiplexer. For example, an interface standard such as a synchronous serial interface for transport of MPEG-2 data (SMPTE-310M). In the SMPTE-310M interface standard, a constant data rate is decided as an output data rate of the service multiplexer. For example, in case of the 8VSB mode, the output data rate is 19.39 Mbps, and, in case of the 16VSB mode, the output data rate is 38.78 Mbps. Furthermore, in the conventional 8VSB mode transmitting system, a transport stream (TS) packet having a data rate of approximately 19.39 Mbps may be transmitted through a single physical channel. Also, in the transmitting system according to the present invention provided with backward compatibility with the conventional transmitting system, additional encoding is performed on the mobile service data. Thereafter, the additionally encoded mobile service data are multiplexed with the main service data to a TS packet form, which is then transmitted. At this point, the data rate of the multiplexed TS packet is approximately 19.39 Mbps.

At this point, the service multiplexer 100 receives at least one type of main service data and program specific information/program and system information protocol (PSI/PSIP) table data for each main service so as to encapsulate the received data to a TS packet. Also, the service multiplexer 100 receives at least one type of mobile service data and PSI/PSIP table data for each mobile service and encapsulates the received data to transport stream (TS) packets. Depending upon the format of the inputted data, the service multiplexer 100 may or may not receive PSI/PSIP tables for the corresponding mobile service. Subsequently, the TS packets are multiplexed according to a predetermined multiplexing rule and outputs the multiplexed packets to the transmitter 200.

Figure 2:
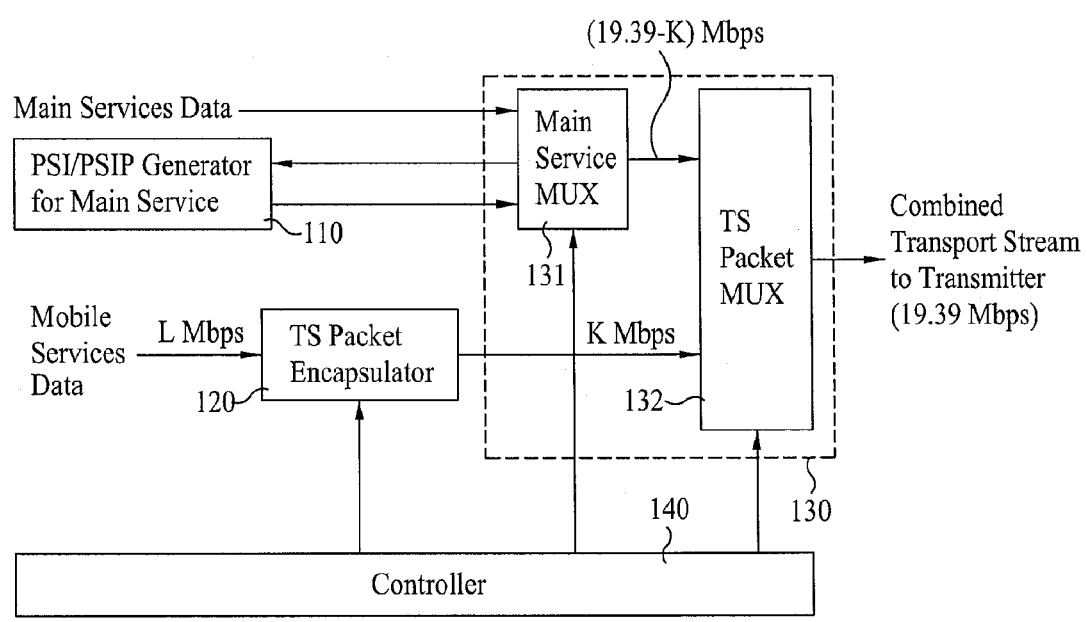
FIG. 2 illustrates a block diagram showing an example of a service multiplexer of FIG. 1.

FIG. 2 illustrates a block diagram showing an example of the service multiplexer. The service multiplexer includes a main service PSI/PSIP generator 110, transport stream (TS) packet encapsulator 120, transport multiplexer 130, and a controller 140. Herein, the controller 140 controls the overall operation of the service multiplexer. The transport multiplexer 130 may include a main service multiplexer 131 and a transport stream (TS) packet multiplexer 132. Referring to FIG. 2, at least one type of compression encoded main service data and the PSI/PSIP table data generated from the main service PSI/PSIP generator 110 are inputted to the main service multiplexer 131 of the transport multiplexer 130. The main service multiplexer 131 encapsulates each of the inputted main service data and PSI/PSIP tables to MPEG-2 TS packet formats. Then, the MPEG-2 TS packets are multiplexed and outputted to the TS packet multiplexer 132. Herein, the data packet being outputted from the main service multiplexer 131 will be referred to as a main service data packet for simplicity.

Meanwhile, the format of the data being transmitted through a studio-to-transmitter link (STL) is defined as a TS packet format. Therefore, when the mobile service data being inputted to the service multiplexer 100 do not correspond to the TS packet format, the mobile service data cannot be transmitted by using the conventional STL. The present invention relates to transmitting mobile service data that do not correspond to the TS packet format to the transmitter using the STL. In the description of the present invention, the mobile service data that do not correspond to the TS packet format will also be referred to as "non-TS packet mobile service data" for simplicity.

In order to do so, the TS packet encapsulator 120 divides the non-TS packet mobile service data being inputted thereto into 184-byte size payloads. Then, the TS packet encapsulator 120 inserts a 4-byte TS packet header (or MPEG header) in each payload. Thereafter, the TS packet encapsulator 120 encapsulates the 188-byte data into a TS packet. For example, if the non-TS packet mobile service data corresponds to IP format mobile service data, the TS packet encapsulator 120 encapsulates the IP format mobile service data to an addressable section structure (e.g., ATSC T3/S13). Then, the TS packet encapsulator 120 configures the encapsulated section format mobile service data to an MPEG-2 TS format, thereby outputting the reconfigured mobile service data (i.e., MPEG-2 TS format mobile service data) to the TS packet multiplexer 132 of the transport multiplexer 130. More specifically, the TS packet encapsulator 120 fragments (or divides) the IP format mobile service data to IP datagrams of a predetermined size. Then, the TS packet encapsulator 120 encapsulates the IP datagrams to addressable section. Subsequently, the TS packet encapsulator 120 encapsulates once again the encapsulated section format mobile service data to a MPEG-2 TS format.

One addressable section consists of one IP datagram having a section header, a checksum, and CRC additionally added thereto. The structure of such addressable section may correspond to a structure of a digital storage media command and control (DSMCC) section format, which is used for transmitting private data. Also, the TS packet consists of an addressable section fragmented into 184-byte payloads, and wherein a 4-byte MPEG header is additionally added to each payload. As described above, the TS packet encapsulator 120 TS-packetizes the non-TS packet mobile service data and then outputs the TS-packetized mobile service data to the TS packet multiplexer 132 of the transport multiplexer 130. When PSI/PSIP table data for the mobile service data are inputted, the mobile service data and the corresponding PSI/PSIP table data are multiplexed in TS packet units, thereby outputted to the TS packet multiplexer 132 of the transport multiplexer 130.

Meanwhile, if the mobile service data being inputted to the TS packet encapsulator 120 corresponds to TS-packet mobile service data, the mobile service data are multiplexed with the corresponding PSI/PSIP table data without having to be encapsulated into a TS packet format. Thereafter, the multiplexed data are outputted to the TS packet multiplexer 132 of the transport multiplexer 130. At this point, when if the PSI/PSIP table data consists of a section format, the second format PSI/PSIP table data are encapsulated to a TS packet format. Then, the encapsulated PSI/PSIP table data are multiplexed with the TS-packet mobile service data, which are then outputted to the TS packet multiplexer 132 of the transport multiplexer 130. In the description of the present invention, the data packet outputted from the TS packet encapsulator 120 will be referred to as a mobile service data packet for simplicity.

Herein, the transport multiplexer 130 multiplexes the main service data packet being outputted from the main service multiplexer 131 and the mobile service data packet being outputted from the TS packet encapsulator 120. Thereafter, the transport multiplexer 130 transmits the multiplexed data packets to the transmitter 200 at a data rate of 19.39 Mbps. The controller 140 controls the TS packet encapsulation process of the TS packet encapsulator 120 and also controls the multiplexing processes of the main service multiplexer 131 and the TS packet multiplexer 132.

FIG. 3 illustrates an example of a syntax structure for a mobile service data packet encapsulated to a TS packet format by the TS packet encapsulator 120 shown in FIG. 2. Generally, a mobile service data packet encapsulated to a TS packet format has a fixed length of 188 bytes. The transport stream (TS) packet broadly consists of a header and a payload. Herein, the header corresponds to an information area, and the payload corresponds to a data area. At this point, depending upon whether or not an adaptation field is included in the mobile service data packet, the payload has a variable length within the range of 0 to 184 bytes. If an adaptation field is not included in the TS packet, the payload of the TS packet is fixed to 184 bytes. The mobile service data being inputted to the TS packet encapsulator 120 is inserted in the payload of the mobile service data packet encapsulated to a TS packet format.

Referring to FIG. 3, the mobile service data packet includes a sync_byte field, a transport_error_indicator field, a payload_unit_start_indicator field, a transport_priority field, a PID field, a transport_scrambling_control field, an adaptation_field_control field, a continuity_counter field, an adaptation_field( ) field, and/or a Mobile_service_ data( ) field. Herein, the sync_byte field, the transport_error_indicator field, the payload_unit_start_indicator field, the transport_priority field, the PID field, the transport_ scrambling_control field, the adaptation_field_control field, and the continuity_counter field correspond to the 4-byte header. The length of the payload is decided based upon whether or not an adaptation field is included in the mobile service data packet. Furthermore, the Mobile_service_data( ) field is allocated to the payload. The non-TS packet mobile service data, which are inputted to the TS packet encapsulator 120, are also allocated to the Mobile_service_data( ) field.

Referring to FIG. 3, the sync_byte field is an 8-bit field indicating a synchronization byte of the corresponding mobile service data packet. For example, the sync_byte field may be assigned with a field value of '0x47'. The transport_error_indicator field corresponds to a 1-bit field, which indicates whether or not an error has occurred in the corresponding mobile service data packet. According to the embodiment of the present invention, the value of the transport_error_indicator field may be used as an identification information for identifying the mobile service data packet. For example, an agreement may be made between the service multiplexer 100 and the transmitter 200 so that the value of the transport_error_indicator field of the mobile service data packet is set to '1'. The payload_unit_start_indicator field may also correspond to a 1-bit field, which is used to notify the beginning (or starting point) of a packet.

The transport_priority field is assigned with 1 bit. Herein, when packets each having the same PID exist within a transmission path, the transport_priority field indicates the priority of the packets. For example, when the transport_priority field value is equal to '1', among the packets each having the same PID, the corresponding packet will have a higher priority as compared to the packets corresponding to transport_priority=0. The PID field is a 13-bit field, which indicates a unique (or field-specific) value that can allow each packet to be identified. According to the embodiment of the present invention, the PID field value may be used as an identification information for identifying the mobile service data. The transport_scrambling_control field corresponds to a 2-bit field, which indicates whether or not the corresponding mobile service data packet has been scrambled.

The adaptation_field_control field is a 2-bit field, which indicates whether or not an adaptation field is included in the payload of the corresponding mobile service data packet. The adaptation_field_control field indicates whether or not an adaptation field is included. For example, when the adaptation_field_control field value is equal to '10' or '11', this indicates that an adaptation field is included in the corresponding mobile service data packet. At this point, when the adaptation_field_control field value is equal to '10', this indicates that a payload region does not exist in the corresponding mobile service data packet. And, when the adaptation_field_control field value is equal to '11', this indicates that the length of the payload region may vary depending upon the length of the adaptation field. Furthermore, when the adaptation_field_control field value is equal to '01', this indicates that an adaptation field is not included in the payload region of the corresponding mobile service data packet. Finally, a value of '00' is not used in the adaptation_field_control field.

The continuity_counter field is used in packets having the same PID. Herein, the count for the packets having the same PID increases by one. However, if the adaptation_field_control field value is equal to '00' or '10', the packet count does not increase. In other words, when a payload does not exist in the packet, the packet count does not increase. Furthermore, when the adaptation_field_control field reaches its maximum value of '15', the count cycles back to '0'. Based upon the value of the adaptation_field_control field, the adaptation_field( ) field and/or the Mobile_service_data( ) field may be included after the continuity_counter field.

More specifically, when the adaptation_field_control field value is equal to '10' or '11', the adaptation_ field( ) field is included in the corresponding mobile service data packet. For example, when the adaptation_field_control field value is equal to '10', a payload region does not exist in the corresponding mobile service data packet. Therefore, no mobile service data are transmitted through the corresponding mobile service data packet. Also, when the adaptation_field_control field value is equal to '01' or '11', the Mobile_service_data ( ) field is included in the corresponding mobile service data packet. And, mobile service data are outputted through the Mobile_service_data( ) field. For example, when the adaptation_field_control field value is equal to '11', the size of the payload included in the corresponding mobile service data packet is decided based upon the length of the data being inputted to the adaptation_field( ). Furthermore, when the adaptation_field_control field value is equal to '01', an adaptation field is not included in the corresponding mobile service data packet. Therefore, 184 bytes are allocated to the payload.

The Mobile_service_data( ) field is an 8-bit field. Herein, N1 is a value for repeating the Mobile_service_data( ) field. N1 represents the length of the byte-unit payload included in the corresponding mobile service data packet (i.e., payload length=188−[length of 4-byte header]−[length of adaptation field]). The Mobile_service_data( ) field is repeated N1 number of times, thereby transmitting the mobile service data. More specifically, the mobile service data as well as transmission parameters may be inserted into the Mobile_service_data( ) field and then transmitted. Herein, the transmission parameters correspond to additional information that are to be transmitted to the transmitter 200 and/or receiving system.

The order, position, and definition of the fields allocated to the mobile service data packet described in FIG. 3 are merely examples presented to facilitate and simplify the understanding of the present invention. In other words, the order, position, and definition of the fields allocated to the mobile service data packet may be easily altered or modified by the system designer. Therefore, the present invention will not be limited to the examples given in the above-described embodiment of the present invention.

FIG. 4 illustrates an example of a syntax structure for the Mobile_service_data( ) field shown in FIG. 3. Referring to FIG. 4, a Mobile_service_data_length field, a Tx_parameter( ) field, and/or a Mobile_service_data_payloads field may be included in the Mobile_service_data( ) field. The Mobile_service_data_length field is an 8-bit field, which indicates the total length of the Mobile_service_data( ) field. Herein, the value indicated in the Mobile_service_data_length field is smaller than or equal to the payload length of the corresponding mobile service data packet. For example, when the Mobile_service_data_length field is smaller than the payload length of the corresponding mobile service data packet, the remaining space (or portion) of the payload may be filled with null data (also referred to as stuffing byte or dummy data).

The Tx_parameter( ) field may transmit transmission parameters required by the transmitter and/or the receiving system in order to process the mobile service data. Depending upon the length of the Tx_parameter( ) field, the Mobile_service_data_payloads field may be included after the Tx_parameter( ) field. The Mobile_service_data_payloads field is an 8-bit field. Herein, N2 represents a value for repeating the Mobile_service_data_payloads field. N2 may be decided by subtracting the length of the Tx_parameter( ) field from the total length of Mobile_service_data( ) field (i.e., the value of the Mobile_service_data_length field). The Mobile_service_data_payloads field is repeated N2 number of times, thereby transmitting pure mobile service data.

The transmission parameters transmitted to the Tx_parameter( ) field correspond to signaling information required by the transmitter and/or the receiving system for processing the mobile service data. Examples of the transmission parameter may include a mobile service identification information, a data group information, a region information within a specific data group, a RS frame information, a super frame information, a burst information, a turbo code information, a RS code information, and so on. The burst information includes a burst size information, a burst period information, a time to next burst (TNB) information, and so on. Herein, a burst period refers to a cycle period according to which a burst that transmits the same type of mobile service is being repeated. The burst size indicates the number of data groups included in a single burst. Also, the data group includes a plurality of mobile service data packets, and a plurality of such data groups is grouped to configure a burst. The burst section indicates the beginning (or starting) point of the current burst up to the beginning (or starting) point of the next burst. Herein, the burst section includes a section including the data group (also referred to as a burst-on section) and a section not including the data group (also referred to as a burst-off section). More specifically, a burst-on section consists of a plurality of fields, wherein one field may include on data group.

Furthermore, the transmission parameter may also include information on an encoding method used for encoding symbol region signals for transmitting the mobile service data, and also multiplexing information on how the multiplexing is performed on the main service data and mobile service data, or on a plurality of mobile service data types. The information included in the transmission parameter are merely exemplary to facilitate the understanding of the present invention. And, the adding and deleting of the information included in the transmission parameter may be easily modified and changed by anyone skilled in the art. Therefore, the present invention is not limited to the examples proposed in the description set forth herein.

FIG. 5 illustrates an example of a syntax structure for the Tx_parameter( ) field of FIG. 4. Referring to FIG. 4, the Tx_parameter( ) field may include a tx_parameter_length field, a service_id field, a super_frame_size field, a burst_size field, a burst_period field, a RS_code_mode field, and a turbo_code_mode field. The Tx_parameter( ) field may further include an additional_parameter( ) field. The tx_parameter_length field is an 8-bit field, which indicates the total length of the corresponding Tx_parameter( ) field. The service_id field is a 4-bit field, which indicates a mobile service identifier (i.e., mobile service ID) that can uniquely identify each of the mobile services.

The super_frame_size field is a 4-bit field, which indicates the size of a super frame. More specifically, the transmitter 200 configures a RS frame so as to perform error correction encoding. Then, the transmitter 200 groups a plurality of error correction encoded RS frames, thereby configuring a super frame. The transmitter 200 may perform interleaving processes in super frame units. In this case, the super_frame_size field indicates the number of RS frames configuring the super frame. Furthermore, the super_frame_size field corresponds to one of the transmission parameters being transmitted along with the mobile service data, when the corresponding mobile service data are transmitted to the receiving system from the transmitter 200. Herein, 2 reserved bits may be allocated after the super_frame_size field.

The burst_size field is a 6-bit field, which indicates the size of a burst. More specifically, when the transmitter 200 transmits the mobile service data in burst units, the burst_size field indicates the number of data groups configuring a burst. The burst_size field also corresponds to one of the transmission parameters being transmitted along with the mobile service data, when the corresponding mobile service data are transmitted to the receiving system from the transmitter 200. The burst_period field is an 8-bit field, which indicates the cycle period of a burst (i.e., burst period). More specifically, when the transmitter 200 transmits mobile service data in burst units, the burst_period field is used to indicate a repetition period of a burst that transmits identical types of mobile services. Herein, the number of data fields indicates the burst repetition period. The burst_period field also corresponds to one of the transmission parameters that are transmitted to the receiving system along with the corresponding mobile service data from the transmitter 200. Herein, 1 reserved bit may be allocated after the burst_period field.

Figure 12A:
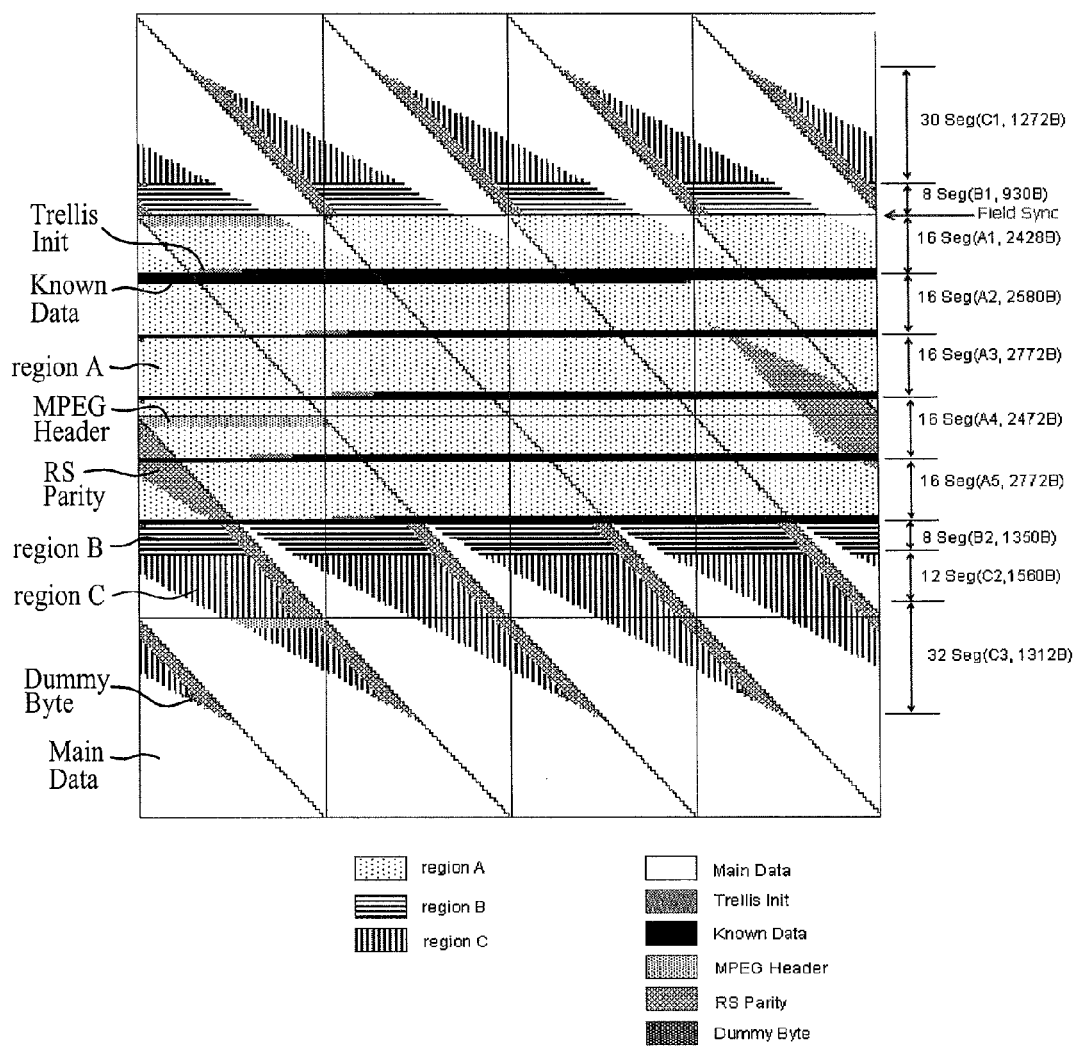
FIG. 12A and FIG. 12B illustrate data configuration before and after a data deinterleaver in a transmitting system according to the present invention.
Figure 12B:
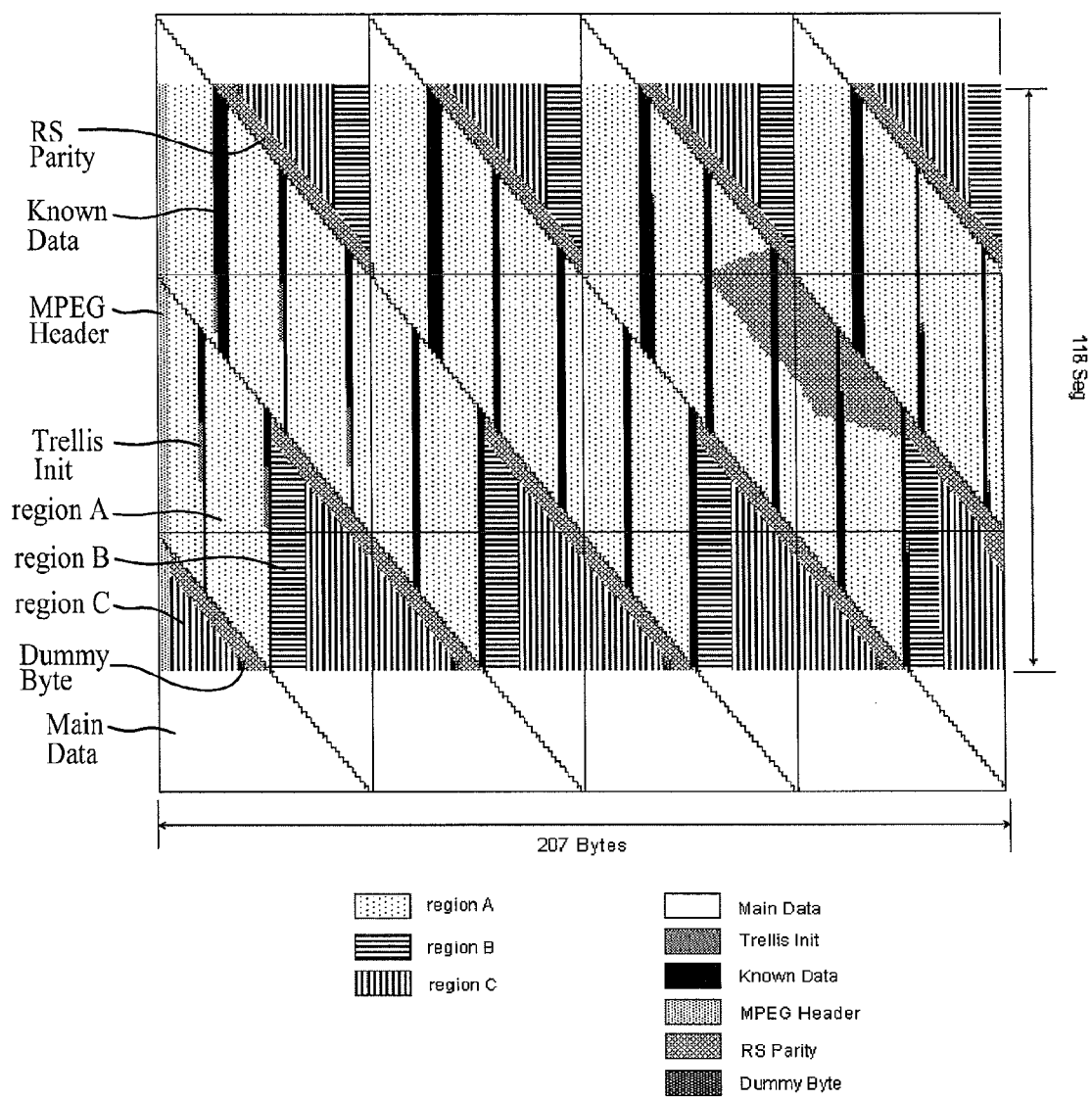

The RS_code_mode field is a 4-bit field, which indicates the RS code mode applied to each region within the data group. For example, a plurality of mobile service data packets may be grouped to form a data group, and a plurality of data groups may be grouped to form a burst. At this point, a data group is divided into regions A, B, and C, as shown in FIG. 12A and FIG. 12B. Detailed description of the process of distinguishing the regions within the data group and of each of the regions will be given while describing the transmitter 200 in a later process with reference to FIG. 12A and FIG. 12B. When a data group is divided in to regions A, B, and C, as shown in FIG. 12A and FIG. 12B, FIG. 6 illustrates an example of a RS code mode applied to regions A/B, and FIG. 7 illustrates an example of a RS code mode applied to region C within a data group. For example, when the value of the RS_code_mode field is equal to '1110', the transmitter 200 performs (235,187)-RS encoding on a RS frame that is to be allocated to regions A/B, thereby generating 48 parity bytes. The transmitter 200 then performs (223,187)-RS encoding on a RS frame that is to be allocated to region C, thereby generating 36 parity bytes.

The turbo_code_mode field is a 3-bit field, which indicates the turbo code mode applied to each region within the data group. FIG. 8 illustrates examples of a turbo code mode applied to regions A/B and to region C within a data group. For example, when the turbo_code_mode field value is equal to '001', the transmitter 200 encodes the mobile service data that are to be allocated to regions A/B at a coding rate of ½. Alternatively, the transmitter 200 encodes the mobile service data that are to be allocated to region C at a coding rate of ¼. The additional_parameter( ) field is an 8-bit field, which is reserved for future usage. The additional_parameter( ) field is repeated as many times as 5 bytes subtracted from the value of the tx_parameter_length field. This is because 5 bytes are allocated to the region starting from the tx_parameter_length field to the turbo_code_mode field, as shown in FIG. 5. For example, the additional_parameter( ) field may be filled with null data.

As described above, the service multiplexer 100 encapsulates non-TS packet mobile service data to TS packet mobile service data. Then, the service multiplexer 100 inserts mobile service data and/or transmission parameters in the corresponding mobile service data packet. The processed data are then transmitted to the transmitter 200. Accordingly, the transmitter 200 uses the transmission parameters so as to process mobile service data. The order, position, and definition of the fields allocated to the Tx_parameter( ) field described in FIG. 5 are merely examples presented to facilitate and simplify the understanding of the present invention. In other words, the order, position, and definition of the fields allocated to the Tx_parameter( ) field may be easily altered or modified by the system designer. Therefore, the present invention will not be limited to the examples given in the above-described embodiment of the present invention.

Meanwhile, the transport multiplexer 130 used in the conventional digital broadcasting system may be used as the transport multiplexer 130 according to the present invention. More specifically, the data rate of the main service data outputted from main service multiplexer 131 is limited to a data rate of (19.39-K) Mbps. Then, K Mbps, which corresponds to the remaining data rate, is assigned as the data rate of the mobile service data packet outputted from the TS packet encapsulator 120. Thus, the transport multiplexer which is already being used may be used as it is without any modification. Herein, the transport multiplexer 130 multiplexes the main service data packet that are outputted from the main service multiplexer 131 and the mobile service data packet that are outputted from the TS packet encapsulator 120. Thereafter, the transport multiplexer 130 transmits the multiplexed data packets to the transmitter 200.

When K Mbps is assigned as the output data rate of the TS packet encapsulator 120, a data rate of L Mbps of the mobile service data being inputted to the TS packet encapsulator 120 becomes equal to or less than a half (½) of K Mbps. This is because the pre-processor of the transmitter has already performed additional encoding on the mobile service data, thereby increasing the data amount. Accordingly, the data rate of the mobile service data that may be inputted to the TS packet encapsulator 120 becomes smaller (or lower). For example, the pre-processor of the transmitter performs RS frame encoding and encoding at a coding rate of at least ½ on the mobile service data, thereby increasing the amount of mobile service data. For such reason, if the TS encapsulation process is performed only on the mobile service data that are inputted to the TS packet encapsulator 120, the output data rate of the TS packet encapsulator 120 eventually becomes smaller than K Mbps.

In order to match the output data rate of the TS packet encapsulator 120 to K Mbps, as described above, transmission parameters may also be inserted when inserting the mobile service data in the mobile service data packet. However, in some occasion, even if the transmission parameters are inserted in the mobile service data packet, the output data rate of the TS packet encapsulator 120 may not be equal to K Mbps. At this point, the TS packet encapsulator 120 may use at least one method, so as to match the output data rate to K Mbps. According to an embodiment of the present invention, when configuring the mobile service data packet, the mobile service data packet may be set so that transmission parameters can be only inserted in a particular (or specific) mobile service data packet and that the mobile service data are not inserted. In this case, null data are inserted in the region within the mobile service data packet, wherein the mobile service data are to be inserted.

According to another embodiment of the present invention, the mobile service data packet may be configured so that neither the mobile service data nor the transmission parameters are inserted therein. In this case, null data may be inserted in the regions within the mobile service data packet, wherein the mobile service data and the transmission parameters are to be inserted, respectively. Furthermore, a value of '0' is allocated to the tx_parameter_length field of the corresponding mobile service data packet. Accordingly, regions for the transmission parameters may not be allocated within the corresponding mobile service data packet. The mobile service data packets that do not include the transmission parameters and the mobile service data will be referred to as null data packets for simplicity. At this point, identification information for identifying the mobile service data packets and the null data packets may be included in the corresponding data packet and then transmitted.

According to yet another embodiment of the present invention, by inserting null data in the regions wherein the transmission parameters are to be inserted within the mobile service data packet and by outputting the processed data packet, the output data rate of the TS packet encapsulator 120 may be set (or matched) to K Mbps. Also, identification information for identifying mobile service data packets having null data inserted in the transmission parameter regions may be inserted the corresponding data packet and then transmitted. For example, in the Tx_parameter( ) field structure shown in FIG. 5, the length of the Tx_parameter( ) field may be indicated in the tx_parameter_length( ) field. Also, identification information for identifying the data packet as the mobile service data packet having null data inserted in the transmission parameter region of the corresponding data packet may be indicated in the service_id field.

In this case, the transmission parameter region following the service_id field may be filled with null data. More specifically, the service_id field may be used as an identifier for identifying (or distinguishing) the type of mobile service data being transmitted to the corresponding mobile service data packet. The service_id field may also be used as an identifier for identifying (or distinguishing) the mobile service data packet having null data inserted in the transmission parameter regions of the corresponding data packet. Herein, the identification information for identifying the mobile service data packet having null data inserted in the transmission parameter regions of the corresponding data packet is not limited only to the above described embodiments of the present invention. Furthermore, according to yet another embodiment of the present invention, by inserting null data in a payload of an operations and maintenance packet (also referred to as an OM packet or an OMP), the output data rate of the TS packet encapsulator 120 may be set (or matched) to K Mbps.

More specifically, a packet referred to as an OMP is defined for the purpose of operating and managing the transmitting system. For example, the OMP is configured in accordance with the MPEG-2 TS packet format, and the corresponding PID is given the value of 0x1FFA. The OMP is configured of a 4-byte header and a 184-byte payload. Herein, among the 184 bytes, the first byte corresponds to an OM_type field, which indicates the type of the OM packet. Also, the remaining 183 bytes correspond to an OM_payload field, wherein actual data bytes are inserted. In the present invention, among the values of the reserved fields within the OM_type field, a pre-arranged value is used, thereby identifying the corresponding OM packet as a packet inserted to match (or put to accord) the data rate. In this case, the OM_payload field within the OM packet may be filled with null data. Accordingly, the transmitter 200 may find (or identify) the OMP by referring to the PID. Also, by parsing the OM_type field within the OMP, the transmitter 200 can determine the null data have been inserted in the corresponding OM packet. More specifically, when an OM packet is inserted in the transmitter 200, the inputted OM packet may be verified as the data packet that has been transmitted in order to match data rate.

Meanwhile, the transmitter 200 requires identification information in order to identify and process the main service data packet and the mobile service data packet. Herein, the identification information may use values pre-decided in accordance with an agreement between the transmitting system and the receiving system, or may be configured of a separate set of data, or may modify predetermined location value with in the corresponding data packet. According to an embodiment of the present invention, a different packet identifier (PID) may be assigned (or allocated) to identify each of the main service data packet and the mobile service data packet.

According to another embodiment of the present invention, by modifying a synchronization data byte within a header of the mobile service data, the service data packet may be identified by using the synchronization data byte value of the corresponding service data packet. For example, the synchronization byte of the main service data packet directly outputs the value decided by the ISO/IEC13818-1 standard (i.e., 0x47) without any modification. The synchronization byte of the mobile service data packet modifies and outputs the value, thereby identifying the main service data packet and the mobile service data packet. Conversely, the synchronization byte of the main service data packet is modified and outputted, whereas the synchronization byte of the mobile service data packet is directly outputted without being modified, thereby enabling the main service data packet and the mobile service data packet to be identified. A plurality of methods may be applied in the method of modifying the synchronization byte. For example, each bit of the synchronization byte may be inversed, in other words, bitwise inversion may be performed, or only a portion of the synchronization byte may be inversed.

According to yet another embodiment of the present invention, the transport_error_indicator flag field within the header of a data packet may be used as the identification information, so that the main service data packet and the mobile service data packet can be distinguished from one another. For example, by setting the transport_error_indicator flag field of the mobile service data packet to '1', and by resetting the transport_error_indicator flag field of all other data packets excluding the mobile service data packet to '0', the mobile service data packet may be identified. As described above, any identification information that can distinguish the main service data packets from the mobile service data packets may be used. Therefore, the present invention will not be limited only to the examples given in the description of the present invention.

Meanwhile, the TS packet encapsulator 120 may insert the mobile service data being inputted in a non-TS packet format into the OM_payload field within the OM packet. Thereafter, the TS packet encapsulator 120 transmits the processed data to the transmitter. Herein, FIG. 9 illustrates a syntax structure of the PM packet according to an embodiment of the present invention. Particularly, in the example given herein, FIG. 9 particularly illustrates a syntax structure of the 184 bytes excluding the 4-byte packet header. In the example shown in FIG. 9, the Mobile_service_data field of FIG. 4 is inserted after the OM_type field, thereby transmitting the mobile service data. At this point, an identification information for identifying the OM packet as the data packet having mobile service data inserted therein and then transmitted is required. According to an embodiment of the present invention, the OM_type field of the corresponding OM packet may be used as the identifier.

The present invention uses a pre-arranged value among the reserved field values of the OM_type field so as to identify the corresponding OM packet as the data packet for transmitting the mobile service data. Accordingly, the transmitter 200 may locate (or find) the OMP by referring to the PID. Also, by parsing the OM_type field within the OMP, the transmitter 200 can determine whether the mobile service data have been inserted in the corresponding packet. More specifically, the mobile service data having the Mobile_service_data( ) syntax structure, shown in FIG. 4, are inserted in the OM_payload field within the OM packet. Then, the transmitter 200 may indicate in the OM_type field whether or not the mobile service data have been inserted in the corresponding packet.

Furthermore, since the Mobile_service_data( ) field of FIG. 4 includes the Tx_parameter( ) syntax structure, shown in FIG. 5, the transmission parameters may also be inserted in the OM packet. Also, as described above, in order to set and match the output data rate of the TS packet encapsulator 120 to K Mbps, null data may be inserted in the Mobile_service_data field of the OM packet. As described above, the TS packet encapsulator 120 may match the output data rate to K Mbps, thereby transmitting the TS-packet mobile service data to the transport multiplexer 130. The transport multiplexer 130 then multiplexes the main service data packet outputted from the main service multiplexer 131 and the mobile service data packet (or OM packet) outputted from the TS packet encapsulator 120. Thereafter, the transport multiplexer 130 transmits the processed data at a data rate of 19.39 Mbps.

FIG. 9 illustrates a block diagram showing an example of the transmitter 200 according to an embodiment of the present invention. Herein, the transmitter 200 includes a demultiplexer 211, a packet jitter mitigator 212, a TS packet decapsulator 213, a pre-processor 214, a packet multiplexer 215, a post-processor 220, a synchronization (sync) multiplexer 230, and a transmission unit 240. Herein, a data packet transmitted from the service multiplexer 100 is inputted to the demultiplexer 211 of the transmitter 200. Then, the demultiplexer 211 determines whether or not the data packet corresponds to a main service data packet or a mobile service data packet. The main service data packet identified by the demultiplexer 211 is provided to the packet jitter mitigator 212, and the mobile service data packet identified by the demultiplexer 211 is provided to the TS packet decapsulator 213. At this point, the demultiplexer 211 may use a plurality of methods for identifying (or determining) whether or not the corresponding data packet is a main service data packet or a mobile service data packet.

According to an embodiment of the present invention, the corresponding data packet may be identified as either the main service data packet or the mobile service data packet, based upon a PID value of the data packet that is being inputted. More specifically, the demultiplexer 211 provides data packets having PIDs allocated to mobile service data packets to the TS packet decapsulator 213. Also, the demultiplexer 211 provides the data packets having the remaining PIDs included therein to the packet jitter mitigator 212. According to another embodiment of the present invention, the demultiplexer 211 may identify (or determine) the inputted data packet as one of the mobile service data packet and the main service data packet, based upon the transport_error_indicator flag field value within the inputted data packet.

According to yet another embodiment of the present invention, when the mobile service data are inserted in the OM packet and then transmitted, the demultiplexer 211 may refer to the PID so as to locate (or find) the OM packet. By parsing the OM_type field, the demultiplexer 211 may also determine whether the mobile service data have been inserted in the OM_payload field of the corresponding packet. If the inputted data packet corresponds to the OM_packet having the mobile service data inserted therein, the corresponding data packet may be provided to the TS packet decapsulator 213. The TS packet decapsulator 213 recovers the inputted mobile service data packet (or OM packet) to the mobile service data prior to the TS packet encapsulation process. Thereafter, the TS packet decapsulator 213 outputs the recovered data to the pre-processor 214. Also, in case transmission parameters are inserted in the mobile service data packet (or OM packet), the TS packet decapsulator 213 also recovers the transmission parameters. Thereafter, the TS packet decapsulator 213 provides the recovered transmission parameters to each block (e.g., the pre-processor 214, the packet multiplexer 215, etc.) requiring the transmission parameters. Thus, each corresponding block may adequately utilize each of the recovered transmission parameters, respectively.

Herein, for example, the transmission parameters may include a mobile service identification information, a super frame information, a burst size information, a burst period information, a turbo code information, a RS code information, and so on. The information included in the transmission parameters are merely exemplary so as to facilitate the understanding of the present invention. And, the adding and deleting of the information included in the transmission parameter may be easily modified and changed by anyone skilled in the art. Therefore, the present invention is not limited to the examples proposed in the description set forth herein.

At this point, if null data have been inserted in the mobile service data packet, which is being inputted to the TS packet decapsulator 213, so as to match (or fix) the output data of the service multiplexer 100, the TS packet decapsulator 213 does not process the null data and does not provide the null data to another block, either. For example, the null data may all be inserted in the payload region within the inputted mobile service data packet. Alternatively, the null data may only be inserted in the transmission parameter regions of the payload region. Furthermore, the null data may also be inserted in the OM_payload field of the OM packet.

The mobile service data packet being inputted to the TS packet decapsulator 213 may also include identification information, which can determine whether the corresponding packet includes data Then, the TS packet decapsulator 213 may use the identification information to extract null data from the inputted data packet. For example, the TS packet decapsulator 213 may use the PID field within the header of the inputted data packet in order to extract the null data. Alternatively, the TS packet decapsulator 213 may also use the service_id field within the transmission parameter region within the payload of the inputted data packet in order to extract the null data. Furthermore, if the null data are inserted in the OM_payload field of the OM packet, the TS packet decapsulator 213 parses the OM_type field within the OM packet (OMP), thereby determining whether or not the null data have been inserted in the OM_payload field of the corresponding packet. The pre-processor 214 performs additional encoding on the mobile service data packet, thereby enabling the mobile service data to respond more effectively to noise and channel environment that undergoes frequent changes. The additionally encoded mobile service data are then outputted to the packet multiplexer 215.

Figure 10:
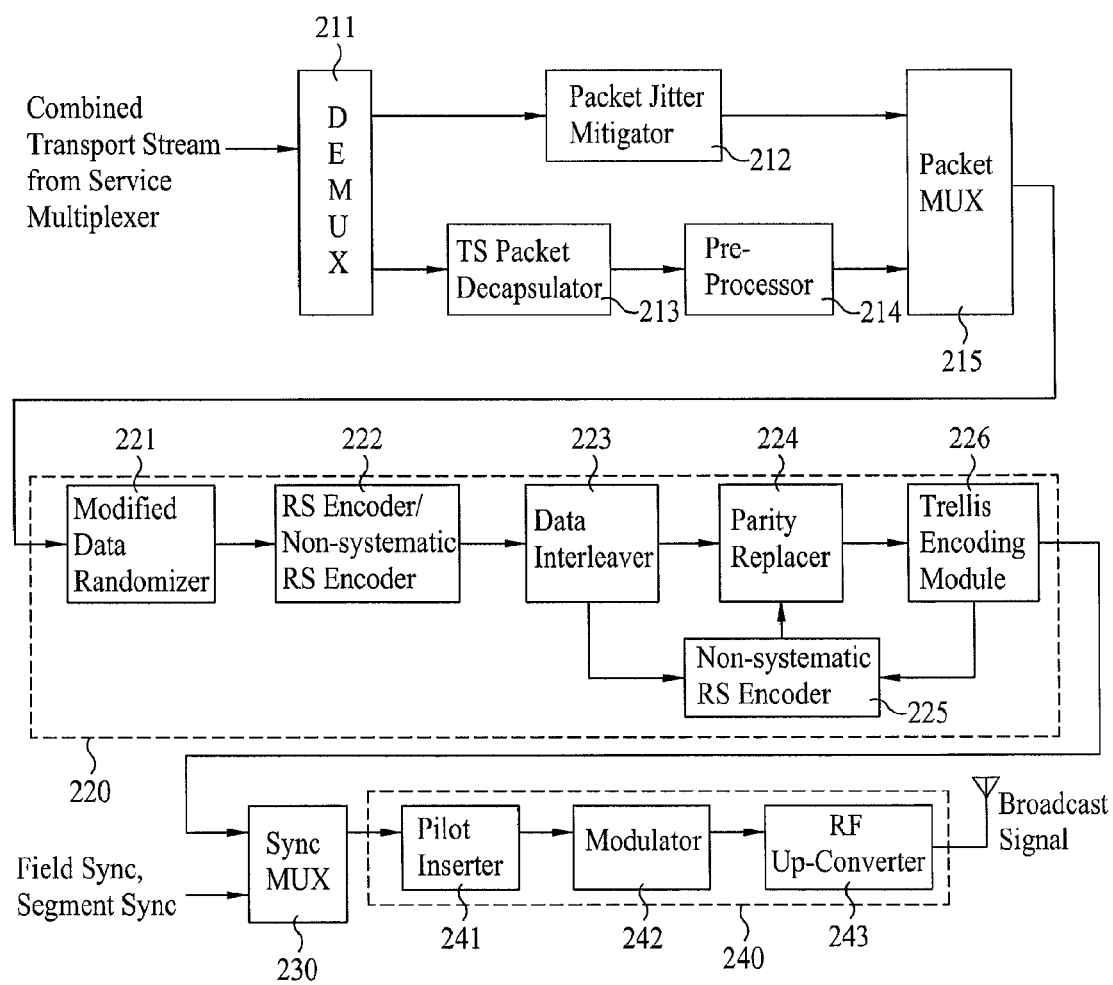
FIG. 10 illustrates a block diagram showing an example of a transmitter of FIG. 1.
Figure 11:
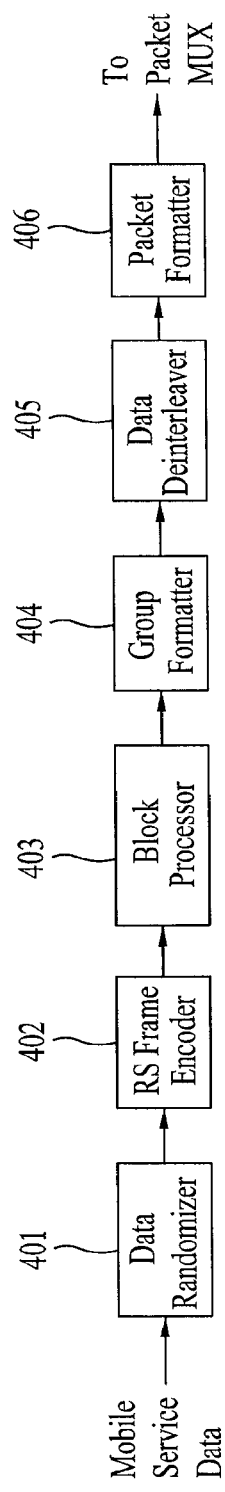
FIG. 11 illustrates a block diagram showing an example of a pre-processor of FIG. 10.

FIG. 10 illustrates a block diagram of the pre-processor 214 according to an embodiment of the present invention. Herein, the pre-processor 214 includes a data randomizer 401, a RS frame encoder 402, a block processor 403, a group formatter 404, a data deinterleaver 405, and a packet formatter 406. The pre-processor 214 according to the embodiment of the present invention refers to the transmission parameter provided by the TS packet decapsulator 213, thereby performing additional encoding on the inputted mobile service data. More specifically, the data randomizer 401 receives mobile service data and randomizes the received mobile service data, thereby outputting the processed data to the RS frame encoder 402. At this point, by having the data randomizer 401 randomize the mobile service data, a later randomizing process on the mobile service data performed by the data randomizer 221 of the post-processor 220 may be omitted.

The RS frame encoder 402 groups a plurality of the received mobile service data packets that have been randomized. Then, the RS frame encoder 402 performs at least one of an error correction encoding process and an error detection encoding process on the received randomized mobile service data. Furthermore, the RS frame encoder 402 may also group a plurality of RS frames so as to configure a super frame, thereby performing interleaving (or permutation) processes in super frame units. Thus, by providing robustness on the mobile service data, the corresponding data may be able to respond to the severely vulnerable and frequently changing frequency environment.

More specifically, when the RS frame encoder 402 performs row permutation based upon a predetermined rule for permuting each row of the super frame, the row positions within the super frame after the row permutation process may differ from the row positions within the super frame prior to the row permutation (or interleaving) process. Herein, by performing the row permutation (or interleaving) process in super frame units, even though the section having a plurality of errors occurring therein becomes very long, and even though the number of errors included in the RS frame that is to be decoded exceeds the extent of being able to be corrected, the errors become dispersed within the entire super frame. Thus, the decoding ability is even more enhanced as compared to a single RS frame.

In the RS frame encoder 402 according to the embodiment of the present invention, RS encoding is applied as the error correction encoding process, and cyclic redundancy check (CRC) encoding is applied as the error detection encoding process. When performing RS encoding, parity data that are to be used for error correction are generated. And, when performing CRC encoding, CRC data that are to be used for error detection are generated. Also, in the present invention, the RS encoding corresponds to the forward error correction (FEC) method. The FEC corresponds to a technique for compensating errors that occur during the transmission process. The CRC data generated by CRC encoding may be used for indicating whether or not the mobile service data have been damaged by the errors while being transmitted through the channel. In the present invention, a variety of error detection coding methods other than the CRC encoding method may be used, or the error correction coding method may be used to enhance the overall error correction ability (or performance) of the receiving system.

Herein, the RS frame encoder 402 refers to the pre-set transmission parameter and/or refers to the transmission parameter provided from the TS packet decapsulator 213, thereby being able to perform processes including RS frame configuration, RS encoding, CRC encoding, super frame configuration, and row permutation (or interleaving) in super frame units. For example, when the transmission parameter within the RS code mode (shown in FIG. 6 and FIG. 7) is equal to '1110', the RS frame encoder 402 performs (235, 187)-RS encoding on the RS frame that is to be allocated to regions A/B, thereby generating 48 parity data bytes. Alternatively, the RS frame encoder 402 performs (223,187)-RS encoding on the RS frame that is to be allocated to region C, thereby generating 36 parity data bytes.

As described above, the mobile service data encoded by the RS frame encoder 402 are inputted to the block processor 403. The block processor 403 then encodes the inputted mobile service data at a coding rate of G/H (wherein, G is smaller than H (i.e., G<H)) and then outputted to the group formatter 404. More specifically, the block processor 403 divides the mobile service data being inputted in byte units into bit units. Then, the G number of bits is encoded to H number of bits. Thereafter, the encoded bits are converted back to byte units and then outputted. For example, if 1 bit of the input data is coded to 2 bits and outputted, then G is equal to 1 and H is equal to 2 (i.e., G=1 and H=2). Alternatively, if 1 bit of the input data is coded to 4 bits and outputted, then G is equal to 1 and H is equal to 4 (i.e., G=1 and H=4). Hereinafter, the former coding rate will be referred to as a coding rate of ½ (½-rate coding), and the latter coding rate will be referred to as a coding rate of ¼ (¼-rate coding), for simplicity.

Herein, when using the ¼ coding rate, the coding efficiency is greater than when using the ½ coding rate, and may, therefore, provide greater and enhanced error correction ability. For such reason, when it is assumed that the data encoded at a ¼ coding rate in the group formatter 404, which is located near the end portion of the system, are allocated to a region in which the receiving performance may be deteriorated, and that the data encoded at a ½ coding rate are allocated to a region having excellent receiving performance, the difference in performance may be reduced.

At this point, the block processor 403 may also receive signaling information, such as the transmission parameters. Herein, the signaling information are also encoded at the coding rate of ½ or the coding rate of ¼, which is similarly performed in the step of processing the mobile service data. Afterwards, the signaling information is considered and treated identically as the mobile service data. Meanwhile, the group formatter 404 inserts mobile service data that are outputted from the block processor 403 in corresponding regions within a data group, which is configured in accordance with a pre-defined rule. Also, with respect to the data deinterleaving process, each place holder or known data are also inserted in corresponding regions within the data group. At this point, the data group may be divided into at least one hierarchical region. Herein, the type of mobile service data being inserted to each region may vary depending upon the characteristics of each hierarchical region. For example, each region may be divided based upon the receiving performance within the data group.

In an example given in the present invention, a data group is divided into A, B, and C regions in a data configuration prior to data deinterleaving. At this point, the group formatter 404 allocates the mobile service data, which are inputted after being RS encoded and block encoded, to each of the corresponding regions by referring to the transmission parameter.

FIG. 12A illustrates an alignment of data after being data interleaved and identified, and FIG. 12B illustrates an alignment of data before being data interleaved and identified. More specifically, a data structure identical to that shown in FIG. 12A is transmitted to a receiving system. Also, the data group configured to have the same structure as the data structure shown in FIG. 12A is inputted to the data deinterleaver 405.

As described above, FIG. 12A illustrates a data structure prior to data deinterleaving that is divided into 3 regions, such as region A, region B, and region C. Also, in the present invention, each of the regions A to C is further divided into a plurality of regions. Referring to FIG. 12A, region A is divided into 5 regions (A1 to A5), region B is divided into 2 regions (B1 and B2), and region C is divided into 3 regions (C1 to C3). Herein, regions A to C are identified as regions having similar receiving performances within the data group. Herein, the type of mobile service data, which are inputted, may also vary depending upon the characteristic of each region.

In the example of the present invention, the data structure is divided into regions A to C based upon the level of interference of the main service data. Herein, the data group is divided into a plurality of regions to be used for different purposes. More specifically, a region of the main service data having no interference or a very low interference level may be considered to have a more resistant (or robust) receiving performance as compared to regions having higher interference levels. Additionally, when using a system inserting and transmitting known data in the data group, and when consecutively long known data are to be periodically inserted in the mobile service data, the known data having a predetermined length may be periodically inserted in the region having no interference from the main service data (e.g., region A). However, due to interference from the main service data, it is difficult to periodically insert known data and also to insert consecutively long known data to a region having interference from the main service data (e.g., region B and region C).

Hereinafter, examples of allocating data to region A (A1 to A5), region B (B1 and B2), and region C (C1 to C3) will now be described in detail with reference to FIG. 12A. The data group size, the number of hierarchically divided regions within the data group and the size of each region, and the number of mobile service data bytes that can be inserted in each hierarchically divided region of FIG. 12A are merely examples given to facilitate the understanding of the present invention. Herein, the group formatter 404 creates a data group including places in which field synchronization data bytes are to be inserted, so as to create the data group that will hereinafter be described in detail.

More specifically, region A includes A2 to A5 regions within the data group in which a long known data sequence may be periodically inserted, and in which includes regions wherein the main service data are not mixed. Also, region A includes an A1 region located between a field synchronization region and the region in which the first known data sequence is to be inserted. The field synchronization region has the length of one segment (i.e., 832 symbols) existing in an ATSC system.

For example, referring to FIG. 12A, 2428 bytes of the mobile service data may be inserted in the region A1, 2580 bytes may be inserted in the region A2, 2772 bytes may be inserted in the region A3, 2472 bytes may be inserted in the region A4, and 2772 bytes may be inserted in the region A5. Herein, trellis initialization data or known data, MPEG header, and RS parity are not included in the mobile service data. As described above, when region A includes a known data sequence at both ends, the receiving system uses channel information that can obtain known data or field synchronization data, so as to perform equalization, thereby providing enforced equalization performance.

Also, region B includes a B1 region located within 8 segments at the beginning of a field synchronization region within the data group (chronologically placed before region A1), and a B2 region located within 8 segments behind the very last known data sequence which is inserted in the data group. For example, 930 bytes of the mobile service data may be inserted in the region B1, and 1350 bytes may be inserted in the region B2. Similarly, trellis initialization data or known data, MPEG header, and RS parity are not included in the mobile service data. In case of region B, the receiving system may perform equalization by using channel information obtained from the field synchronization region. Alternatively, the receiving system may also perform equalization by using channel information that may be obtained from the last known data sequence, thereby enabling the system to respond to the channel changes.

Region C includes a C1 region located within 30 segments including and preceding the $9^{th}$ segment of the field synchronization region (chronologically located before region A), a C2 region located within 12 segments including and following the $9^{th}$ segment of the very last known data sequence within the data group (chronologically located after region A), and a C3 region located in 32 segments after the region C2. For example, 1272 bytes of the mobile service data may be inserted in the region C1, 1560 bytes may be inserted in the region C2, and 1312 bytes may be inserted in the region C3. Similarly, trellis initialization data or known data, MPEG header, and RS parity are not included in the mobile service data. Herein, region C (e.g., region C1) is located chronologically earlier than (or before) region A.

Since region C (e.g., region C1) is located further apart from the field synchronization region which corresponds to the closest known data region, the receiving system may use the channel information obtained from the field synchronization data when performing channel equalization. Alternatively, the receiving system may also use the most recent channel information of a previous data group. Furthermore, in region C (e.g., region C2 and region C3) located before region A, the receiving system may use the channel information obtained from the last known data sequence to perform equalization. However, when the channels are subject to fast and frequent changes, the equalization may not be performed perfectly. Therefore, the equalization performance of region C may be deteriorated as compared to that of region B.

When it is assumed that the data group is allocated with a plurality of hierarchically divided regions, as described above, the block processor 403 may encode the mobile service data, which are to be inserted to each region based upon the turbo code mode within the transmission parameter, at a different coding rate. For example, when the turbo code mode is equal to '011' (as shown in FIG. 8), the block processor 403 may encode the mobile service data, which are to be inserted in regions A1 to A5 of region A, at a coding rate of ½. Then, the group formatter 404 may insert the ½-rate encoded mobile service data to regions A1 to A5.

The block processor 403 may encode the mobile service data, which are to be inserted in regions B1 and B2 of region B, at a coding rate of ¼ having higher error correction ability as compared to the ½-coding rate. Then, the group formatter 404 inserts the ¼-rate coded mobile service data in region B1 and region B2. Furthermore, the block processor 403 may encode the mobile service data, which are to be inserted in regions C1 to C3 of region C, at a coding rate of ¼ or a coding rate having higher error correction ability than the ¼-coding rate. Then, the group formatter 404 may either insert the encoded mobile service data to regions C1 to C3, as described above, or leave the data in a reserved region for future usage.

Also, apart from the mobile service data, the group formatter 404 also inserts signaling information including the transmission parameter. The transmitter 200 transmits transmission parameters to the receiving system. For example, the transmission parameters include data group information, region information within a data group, the number of RS frames configuring a super frame (i.e., a super frame size (SFS)), the number of RS parity data bytes (P) for each column within the RS frame, whether or not a checksum, which is added to determine the presence of an error in a row direction within the RS frame, has been used, the type and size of the checksum if the checksum is used (presently, 2 bytes are added to the CRC), the number of data groups configuring one RS frame—since the RS frame is transmitted to one burst section, the number of data groups configuring the one RS frame is identical to the number of data groups within one burst (i.e., burst size (BS)), a turbo code mode, and a RS code mode.

Also, the transmission parameter required for receiving a burst includes a burst period—herein, one burst period corresponds to a value obtained by counting the number of fields starting from the beginning of a current burst until the beginning of a next burst, a positioning order of the RS frames that are currently being transmitted within a super frame (i.e., a permuted frame index (PFI)) or a positioning order of groups that are currently being transmitted within a RS frame (burst) (i.e., a group index (GI)), and a burst size. Depending upon the method of managing a burst, the transmission parameter also includes the number of fields remaining until the beginning of the next burst (i.e., time to next burst (TNB)). And, by transmitting such information as the transmission parameter, each data group being transmitted to the receiving system may indicate a relative distance (or number of fields) between a current position and the beginning of a next burst. The diverse information included in the transmission parameter merely corresponds to examples given to facilitate the understanding of the present invention. Therefore, the proposed examples do not limit the scope or spirit of the present invention and may be easily varied or modified by anyone skilled in the art.

For example, the group formatter 404 inserts the turbo code mode information, as shown in FIG. 8, in a portion of region A, in which a first known data sequence may be inserted. Also, the data group information, the super frame information, the burst information, and so on, are inserted in a portion of region A, in which the mobile service data may be inserted. In addition, apart from the encoded mobile service data outputted from the block processor 403, as shown in FIG. 12A, the group formatter 404 also inserts MPEG header place holders, non-systematic RS parity place holders, main service data place holders, which are related to data deinterleaving in a later process. Herein, the main service data place holders are inserted because the mobile service data bytes and the main service data bytes are alternately mixed with one another in region B and region C, based upon the input of the data deinterleaver. For example, based upon the data outputted after the data-deinterleaving process, the place holder for the MPEG header may be allocated at the very beginning of each packet.

Furthermore, the group formatter 404 either inserts known data generated in accordance with a pre-determined method or inserts known data place holders for inserting the known data in a later process. Additionally, place holders for initializing the trellis encoding module 226 are also inserted in the corresponding regions. For example, the initialization data place holders may be inserted in the beginning of the known data sequence. Herein, the size of the mobile service data that can be inserted in a data group may vary in accordance with the sizes of the trellis initialization data or known data (or known data place holders), MPEG header place holders, and RS parity place holders.

The data outputted from the group formatter 404 are inputted to the data deinterleaver 405. And, the data deinterleaver 405 deinterleaves data by performing an inverse process of the data interleaver on the data and place holders within the data group, which are then outputted to the packet formatter 406. More specifically, when the data and data place holders within the data group configured as shown in FIG. 12A are deinterleaved by the data deinterleaver 405, the data group being outputted to the packet formatter 406 is configured as shown in FIG. 12B. The packet formatter 406 removes the main service data place holders and the RS parity place holders that were allocated for the deinterleaving process from the deinterleaved data being inputted. Then, the packet formatter 406 groups the remaining portion and replaces the 4-byte MPEG header place holder with an MPEG header having a null packet PID (or a PID that is not used in the main service data packet).

Also, when the group formatter 404 inserts known data place holders, the packet formatter 406 may insert actual known data in the known data place holders, or may directly output the known data place holders without any modification in order to make replacement insertion in a later process. Thereafter, the packet formatter 406 identifies the data within the packet-formatted data group, as described above, as a 188-byte unit mobile service data packet (i.e., MPEG TS packet), which is then provided to the packet multiplexer 215.

The packet multiplexer 215 multiplexes the mobile service data packet outputted from the pre-processor 214 and the main service data packet outputted from the packet jitter mitigator 212 in accordance with a pre-defined multiplexing method. Then, the packet multiplexer 215 outputs the multiplexed data packets to the data randomizer 221 of the post-processor 220. Herein, the multiplexing method may vary in accordance with various variables of the system design. One of the multiplexing methods of the packet multiplexer 215 consists of providing a burst section along a time axis and, then, transmitting a plurality of data groups during a burst-on section and transmitting only the main service data during a non-burst section (i.e., a burst-off section). At this point, main service data may also be transmitted in the burst-on section. Furthermore, the packet multiplexer 215 can refer to transmission parameters (e.g., information such as burst size or burst period) so as to determine the number and cycle periods of data groups included in a single burst.

In this case, mobile service data and main service data co-exist in a burst-on section, and only the main service data exist in the burst-off section. Therefore, the main service data section transmitting the main service data exists in both the burst-on section and the burst-off section. At this point, the number of main service data packets included in the main service data section within the burst-on section and the number of main service data packets included in the main service data section within the burst-off section may be equal to or different from one another. When the mobile service data are transmitted in burst units, as described above, a receiving system that only receives the mobile service data may turn on the power only during the burst-on section so as to receive the corresponding data. Also, in this case, the receiving system may turn off the power during burst-off sections, thereby preventing the main service data from being received. Thus, the receiving system is capable of reducing excessive power consumption.

However, since a data group including mobile service data in-between the data bytes of the main service data during the packet multiplexing process, the shifting of the chronological position (or place) of the main service data packet becomes relative. Also, a system object decoder (i.e., MPEG decoder) for processing the main service data of the receiving system, receives and decodes only the main service data and recognizes the mobile service data packet as a null data packet. Therefore, when the system object decoder of the receiving system receives a data group including mobile service data and a main service data packet that is multiplexed with the data group, a packet jitter occurs.

At this point, since a multiple-level buffer for the video data exists in the system object decoder and the size of the buffer is relatively large, the packet jitter generated from the packet multiplexer 215 does not cause any serious problem in case of the video data. However, since the size of the buffer for the audio data is relatively small, the packet jitter may cause some problem. More specifically, due to the packet jitter, an overflow or underflow may occur in the buffer for the main service data of the receiving system (e.g., the buffer for the audio data). Therefore, the packet jitter mitigator 212 re-adjusts the relative position of the main service data packet so that the overflow or underflow does not occur in the buffer of the system object decoder included in the receiving system.

In the present invention, examples of repositioning places for the audio data packets within the main service data in order to minimize the influence on the operations of the audio buffer will be described in detail. The packet jitter mitigator 212 repositions audio packets of the main service data section so that the audio data packets of the main service can be positioned as equally and uniformly as possible. The standard for repositioning the audio data packets in the main service data performed by the packet jitter mitigator 212 will now be described. Herein, it is assumed that the packet jitter mitigator 212 knows the same multiplexing information as that of the packet multiplexer 215, which is placed further behind the packet jitter mitigator 212.

Firstly, if one audio data packet exists in the main service data section (e.g., the main service data section positioned between two data groups) within the burst-on section, the audio data packet is positioned at the very beginning of the main service data section. Alternatively, if two audio data packets exist in the corresponding data section, one audio data packet is positioned at the very beginning and the other audio data packet is positioned at the very end of the main service data section. Further, if more than three audio data packets exist, one audio data packet is positioned at the very beginning of the main service data section, another is positioned at the very end of the main service data section, and the remaining audio data packets are positioned between the first and last audio data packets at equal intervals.

Secondly, during the main service data section before the beginning of a burst-on section, the audio data packet is placed at the very end of the main service data section. Thirdly, during a main service data section after the end of burst-on section, the audio data packet is positioned at the very beginning of the main service data section. And, finally, the data packets other than audio data packets are positioned to vacant spaces (i.e., spaces that are not designated for the audio data packets) in accordance with the inputted order. Meanwhile, when the positions of the main service data packets are relatively re-adjusted, associated program clock reference (PCR) values may also be modified accordingly. The PCR value corresponds to a time reference value for synchronizing the time of the MPEG decoder. Herein, the PCR value is inserted in a specific region of a TS packet and then transmitted. In the embodiment of the present invention, the packet jitter mitigator 212 may also perform the function of correcting (or modifying) the PCR value.

The data outputted from the packet jitter mitigator 212 are inputted to the packet multiplexer 215. As described above, the packet multiplexer 215 multiplexes the main service data packet outputted from the packet jitter mitigator 212 with the mobile service data packet outputted from the pre-processor 214 into a burst structure in accordance with a pre-determined multiplexing rule. Then, the packet multiplexer 215 outputs the multiplexed data packets to the data randomizer 221 of the post-processor 220.

If the inputted data correspond to the main service data packet, the data randomizer 221 performs the same randomizing process as that of the conventional randomizer. More specifically, the synchronization byte within the main service data packet is deleted. Then, the remaining 187 data bytes are randomized by using a pseudo random byte generated from the data randomizer 221. Thereafter, the randomized data are outputted to the RS encoder/non-systematic RS encoder 222. On the other hand, if the inputted data correspond to the mobile service data packet, the data randomizer 221 deletes the synchronization byte from the 4-byte MPEG header included in the mobile service data packet and, then, performs the randomizing process only on the remaining 3 data bytes of the MPEG header. Thereafter, the randomized data bytes are outputted to the RS encoder/non-systematic RS encoder 222.

Additionally, the randomizing process is not performed on the remaining portion of the mobile service data excluding the MPEG header. In other words, the remaining portion of the mobile service data packet is directly outputted to the RS encoder/non-systematic RS encoder 222 without being randomized. This is because a randomizing process has already been performed on the mobile service data in the data randomizer 401. Also, the data randomizer 221 may or may not perform a randomizing process on the known data (or known data place holders) and the initialization data place holders included in the mobile service data packet.

The RS encoder/non-systematic RS encoder 222 performs an RS encoding process on the data being randomized by the data randomizer 221 or on the data bypassing the data randomizer 221, so as to add 20 bytes of RS parity data. Thereafter, the processed data are outputted to the data interleaver 223. Herein, if the inputted data correspond to the main service data packet, the RS encoder/non-systematic RS encoder 222 performs the same systematic RS encoding process as that of the conventional system, thereby adding the 20-byte RS parity data at the end of the 187-byte data. Alternatively, if the inputted data correspond to the mobile service data packet, the RS encoder/non-systematic RS encoder 222 performs a non-systematic RS encoding process. At this point, the 20-byte RS parity data obtained from the non-systematic RS encoding process are inserted in a pre-decided parity byte place within the mobile service data packet.

The data interleaver 223 corresponds to a byte unit convolutional interleaver. The output of the data interleaver 223 is inputted to the parity replacer 224 and to the non-systematic RS encoder 225. Meanwhile, a process of initializing a memory within the trellis encoding module 226 is primarily required in order to decide the output data of the trellis encoding module 226, which is located after the parity replacer 224, as the known data pre-defined according to an agreement between the receiving system and the transmitting system. More specifically, the memory of the trellis encoding module 226 should first be initialized before the received known data sequence is trellis-encoded. At this point, the beginning portion of the known data sequence that is received corresponds to the initialization data place holder and not to the actual known data. Herein, the initialization data place holder has been included in the data by the group formatter 404 in an earlier process. Therefore, the process of generating initialization data and replacing the initialization data place holder of the corresponding memory with the generated initialization data are required to be performed immediately before the inputted known data sequence is trellis-encoded.

Additionally, a value of the trellis memory initialization data is decided and generated based upon a memory status of the trellis encoding module 226. Further, due to the newly replaced initialization data, a process of newly calculating the RS parity and replacing the RS parity, which is outputted from the data interleaver 223, with the newly calculated RS parity is required. Therefore, the non-systematic RS encoder 225 receives the mobile service data packet including the initialization data place holders, which are to be replaced with the actual initialization data, from the data interleaver 223 and also receives the initialization data from the trellis encoding module 226.

Among the inputted mobile service data packet, the initialization data place holders are replaced with the initialization data, and the RS parity data that are added to the mobile service data packet. Thereafter, a new non-systematic RS parity is calculated and then outputted to the parity replacer 224. Accordingly, the parity replacer 224 selects the output of the data interleaver 223 as the data within the mobile service data packet, and the parity replacer 224 selects the output of the non-systematic RS encoder 225 as the RS parity data. Then, the selected data are outputted to the trellis encoding module 226.

Meanwhile, if the main service data packet is inputted or if the mobile service data packet, which does not include any initialization data place holders that are to be replaced, is inputted, the parity replacer 224 selects the data and RS parity that are outputted from the data interleaver 223. Then, the parity replacer 224 directly outputs the selected data to the trellis encoding module 226 without any modification. The trellis encoding module 226 converts the byte-unit data to symbol units and performs a 12-way interleaving process so as to trellis-encode the received data. Thereafter, the processed data are outputted to the synchronization multiplexer 230. The synchronization multiplexer 230 inserts a field synchronization signal and a segment synchronization signal to the data outputted from the trellis encoding module 226 and, then, outputs the processed data to the pilot inserter 241 of the transmission unit 240. Herein, the data having a pilot inserted by the pilot inserter 241 are modulated by the modulator 242 in accordance with a pre-decided modulating method (e.g., VSB method). Thereafter, the modulated data are transmitted to each receiving system through the radio frequency (RF) up-converter 243.

Figure 13:
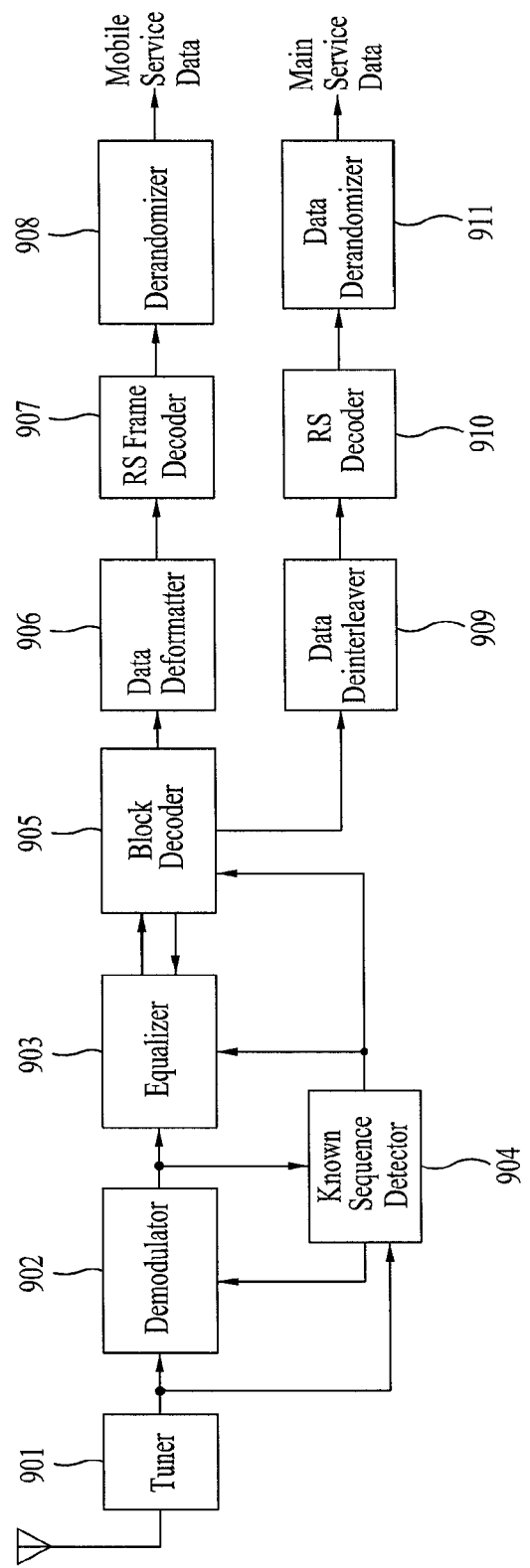
FIG. 13 illustrates a block diagram showing a structure of a receiving system according to an embodiment of the present invention.

FIG. 13 illustrates a block diagram showing a structure of a receiving system according to the present invention. The receiving system of FIG. 13 uses known data information, which are inserted in the mobile service data section and transmitted by the transmitting system, so as to perform carrier synchronization recovery, frame synchronization recovery, and channel equalization, thereby enhancing the receiving performance. Referring to FIG. 13, the receiving system includes a tuner 901, a demodulator 902, an equalizer 903, a known data detector (or known sequence detector) 904, a block decoder 905, a data deformatter 906, a RS frame decoder 907, a derandomizer 908, a data deinterleaver 909, a RS decoder 910, and a data derandomizer 911. Herein, for simplicity of the description of the present invention, the data deformatter 906, the RS frame decoder 907, and the derandomizer 908 will be collectively referred to as a mobile service data processing unit. And, the data deinterleaver 909, the RS decoder 910, and the data derandomizer 911 will be collectively referred to as a main service data processing unit.

More specifically, the tuner 901 tunes a frequency of a particular channel and down-converts the tuned frequency to an intermediate frequency (IF) signal. Then, the tuner 901 outputs the down-converted IF signal to the demodulator 902 and the known sequence detector 904. The demodulator 902 performs self gain control, carrier recovery, and timing recovery processes on the inputted IF signal, thereby modifying the IF signal to a baseband signal. The equalizer 903 compensates the distortion of the channel included in the demodulated signal and then outputs the error-compensated signal to the block decoder 905.

At this point, the known sequence detector 904 detects the known sequence place inserted by the transmitting end from the input/output data of the demodulator 902 (i.e., the data prior to the demodulation process or the data after the demodulation process). Thereafter, the place information (or position indicator) along with the symbol sequence of the known data, which are generated from the detected place, is outputted to the demodulator 902 and the equalizer 903. Also, the known sequence detector 904 outputs a set of information to the block decoder 905. This set of information is used to allow the block decoder 905 of the receiving system to identify the mobile service data that are processed with additional encoding from the transmitting system and the main service data that are not processed with additional encoding.

In addition, although the connection status is not shown in FIG. 13, the information detected from the known sequence detector 904 may be used throughout the entire receiving system and may also be used in the data deformatter 906 and the RS frame decoder 907. The demodulator 902 uses the known data (or sequence) position indicator and the known data symbol sequence during the timing and/or carrier recovery, thereby enhancing the demodulating performance. Similarly, the equalizer 903 uses the known sequence position indicator and the known data symbol sequence so as to enhance the equalizing performance. Moreover, the decoding result of the block decoder 905 may be fed-back to the equalizer 903, thereby enhancing the equalizing performance.

The equalizer 903 may perform channel equalization by using a plurality of methods. An example of estimating a channel impulse response (CIR) in the field synchronization section and the known data section, so as to perform channel equalization will be given in the description of the present invention. Most particularly, an example of estimating the CIR in accordance with each region within the data group, which is hierarchically divided and transmitted from the transmitting system, and applying each CIR differently will also be described herein. Furthermore, by using the known data, the place and contents of which is known in accordance with an agreement between the transmitting system and the receiving system, and the field synchronization data, so as to estimate the CIR, the present invention may be able to perform channel equalization with more stability.

Herein, the data group that is inputted for the equalization process is divided into regions A to C, as shown in FIG. 12A. More specifically, in the example of the present invention, each region A, B, and C are further divided into regions A1 to A5, regions B1 and B2, and regions C1 to C3, respectively. Referring to FIG. 12A, the CIR that is estimated from the field synchronization data in the data structure is referred to as CIR_FS. Alternatively, the CIRs that are estimated from each of the 5 known data sequences existing in region A are sequentially referred to as CIR_N0, CIR_N1, CIR_N2, CIR_N3, and CIR_N4.

As described above, the present invention uses the CIR estimated from the field synchronization data and the known data sequences in order to perform channel equalization on data within the data group. At this point, each of the estimated CIRs may be directly used in accordance with the characteristics of each region within the data group. Alternatively, a plurality of the estimated CIRs may also be either interpolated or extrapolated so as to create a new CIR, which is then used for the channel equalization process.

Herein, when a value F(Q) of a function F(x) at a particular point Q and a value F(S) of the function F(x) at another particular point S are known, interpolation refers to estimating a function value of a point within the section between points Q and S. Linear interpolation corresponds to the simplest form among a wide range of interpolation operations. The linear interpolation described herein is merely exemplary among a wide range of possible interpolation methods. And, therefore, the present invention is not limited only to the examples set forth herein.

Alternatively, when a value F(Q) of a function F(x) at a particular point Q and a value F(S) of the function F(x) at another particular point S are known, extrapolation refers to estimating a function value of a point outside of the section between points Q and S. Linear extrapolation is the simplest form among a wide range of extrapolation operations. Similarly, the linear extrapolation described herein is merely exemplary among a wide range of possible extrapolation methods. And, therefore, the present invention is not limited only to the examples set forth herein.

More specifically, in case of region C1, any one of the CIR_N4 estimated from a previous data group, the CIR_FS estimated from the current data group that is to be processed with channel equalization, and a new CIR generated by extrapolating the CIR_FS of the current data group and the CIR_N0 may be used to perform channel equalization. Alternatively, in case of region B1, a variety of methods may be applied as described in the case for region C1. For example, a new CIR created by linearly extrapolating the CIR_FS estimated from the current data group and the CIR_N0 may be used to perform channel equalization. Also, the CIR_FS estimated from the current data group may also be used to perform channel equalization. Finally, in case of region A1, a new CIR may be created by interpolating the CIR_FS estimated from the current data group and CIR_N0, which is then used to perform channel equalization. Furthermore, any one of the CIR_FS estimated from the current data group and CIR_N0 may be used to perform channel equalization.

In case of regions A2 to A5, CIR_N(i−1) estimated from the current data group and CIR_N(i) may be interpolated to create a new CIR and use the newly created CIR to perform channel equalization. Also, any one of the CIR_N(i−1) estimated from the current data group and the CIR_N(i) may be used to perform channel equalization. Alternatively, in case of regions B2, C2, and C3, CIR_N3 and CIR_N4 both estimated from the current data group may be extrapolated to create a new CIR, which is then used to perform the channel equalization process. Furthermore, the CIR_N4 estimated from the current data group may be used to perform the channel equalization process. Accordingly, an optimum performance may be obtained when performing channel equalization on the data inserted in the data group. The methods of obtaining the CIRs required for performing the channel equalization process in each region within the data group, as described above, are merely examples given to facilitate the understanding of the present invention. A wider range of methods may also be used herein. And, therefore, the present invention will not only be limited to the examples given in the description set forth herein.

Meanwhile, if the data being inputted to the block decoder 905 after being channel equalized from the equalizer 903 correspond to the mobile service data having block encoding and trellis encoding performed thereon by the transmitting system (i.e., data within the RS frame, and signaling information data), trellis decoding and block decoding processes are performed on the inputted data as inverse processes of the transmitting system. Alternatively, if the data being inputted to the block decoder 905 correspond to the main service data having only trellis encoding performed thereon, and not the block encoding (e.g., main service data), only the trellis decoding process is performed on the inputted data as the inverse process of the transmitting system.

The data trellis-decoded and block-decoded by the block decoder 905 are inputted to the data deformatter 906. The block decoder 905 removes the known data, trellis initialization data, and MPEG header, which are inserted in the data group, and the RS parity, which is added by the RS encoder/non-systematic RS encoder or non-systematic RS encoder of the transmitting system from the data included in the data group. Then, the processed data are outputted to the data deformatter 906. Herein, the removal of the data may be performed before the block decoding process, or may be performed during or after the block decoding process. If the transmitting system includes signaling information in the data group upon transmission, the signaling information is outputted to the data deformatter 906.

Meanwhile, the trellis-decoded data transmitted from the block decoder 905 are outputted to the data deinterleaver 909. At this point, the data trellis-decoded by the block decoder 905 and then outputted to the data deinterleaver 909 may include the main service data as well as the data within the RS frame and signaling information data. RS parity data, which are added by the transmitting system after the pre-processor 214 may also be included in the data being outputted to the data deinterleaver 909. In this case, the trellis decoder should be provided before the data deinterleaver 909. If the inputted data correspond to the trellis-encoded data that have not been block-encoded by the transmitting system, the block decoder 905 performs Viterbi decoding on the inputted data so as to output a hard decision value or to perform a hard-decision on a soft decision value, thereby outputting the result. On the other hand, if the inputted data correspond to the data both trellis-encoded and block-encoded by the transmitting system, the block decoder 905 outputs a soft decision value with respect to the inputted data.

In other words, if the inputted data correspond to the data block-encoded by the block processor 403 of the transmitting system and the data trellis-encoded by the trellis encoding module 226 of the transmitting system, the block decoder 905 performs trellis-decoding and block-decoding processes on the input data as inverse processes of the transmitting system. At this point, the RS frame encoder of the transmitting system may be viewed as an external code. And, the trellis encoding module may be viewed as an internal code. In order to maximize the performance of the external code when decoding such concatenated codes, the decoder of the internal code should output a soft decision value.

Meanwhile, the data deinterleaver 909, the RS decoder 910, and the data derandomizer 911 are blocks required for receiving the main service data. Therefore, the above-mentioned blocks may not be required in the structure of a receiving system that only receives the mobile service data. The data deinterleaver 909 performs an inverse process of the data interleaver included in the transmitting system. In other words, the data deinterleaver 909 deinterleaves the main service data outputted from the block decoder 905 and outputs the deinterleaved main service data to the RS decoder 910. The data being inputted to the data deinterleaver 909 may include main service data, as well as mobile service data, known data, RS parity data, and an MPEG header. At this point, among the inputted data, only the main service data and the RS parity data added to the main service data packet may be outputted to the RS decoder 910. Also, all data outputted after the data derandomizer 911 may all be removed with the exception for the main service data. In the embodiment of the present invention, only the main service data and the RS parity data added to the main service data packet are inputted to the RS decoder 910.

The RS decoder 910 performs a systematic RS decoding process on the deinterleaved data and outputs the processed data to the data derandomizer 911. The data derandomizer 911 receives the output of the RS decoder 910 and generates a pseudo random data byte identical to that of the randomizer included in the transmitting system. Thereafter, the data derandomizer 911 performs a bitwise exclusive OR (XOR) operation on the generated pseudo random data byte, thereby inserting the MPEG synchronization bytes to the beginning of each packet so as to output the data in 188-byte main service data packet units.

Meanwhile, the data being outputted from the block decoder 905 to the data deformatter 906 are inputted in the form of a data group. At this point, the data deformatter 906 already knows the structure of the data that are to be inputted and is, therefore, capable of identifying the signaling information, which includes the transmission parameters, and the mobile service data from the data group. Thereafter, the data deformatter 906 outputs the identified signaling information to a block (not shown) for processing the signaling information and outputs the identified mobile service data to the RS frame decoder 907. More specifically, the RS frame decoder 907 receives only the RS-encoded and CRC-encoded mobile service data that are transmitted from the data deformatter 906.

The RS frame encoder 907 performs an inverse process of the RS frame encoder included in the transmitting system so as to correct the error within the RS frame. Then, the RS frame decoder 907 adds the 1-byte MPEG synchronization service data packet, which had been removed during the RS frame encoding process, to the error-corrected mobile service data packet. Thereafter, the processed data packet is outputted to the derandomizer 908. The derandomizer 908 performs a derandomizing process, which corresponds to the inverse process of the randomizer included in the transmitting system, on the received mobile service data. Thereafter, the derandomized data are outputted, thereby obtaining the mobile service data transmitted from the transmitting system.

As described above, the digital broadcasting system and method of processing data according to the present invention have the following advantages. More specifically, the present invention is robust against (or resistant to) any error that may occur when transmitting mobile service data through a channel. And, the present invention is also highly compatible to the conventional system. Moreover, the present invention may also receive the mobile service data without any error even in channels having severe ghost effect and noise.

Additionally, by performing error correction encoding and error detection encoding processes on the mobile service data and transmitting the processed data, the present invention may provide robustness to the mobile service data, thereby enabling the data to effectively respond to the frequent change in channels. Also, when the present invention multiplexes the main service data and the mobile service data in a burst structure, a relative position of a main service data packet is re-adjusted and then multiplexed, thereby mitigating packet jitter, which may occur when the receiving system receives the multiplexed main service data packet.

Moreover, when the main service data and the mobile service data are multiplexed by the service multiplexer within the transmitting system, and when the multiplexed data are transmitted to the transmitter, the present invention transmits the mobile service-related information through the OM packet. Thus, the present invention may match (or fix) the data rate of the final output data of the service multiplexer to a constant data rate. The present invention may also enable the transmitter to process the mobile service data more easily. Furthermore, if the format of the mobile service data inputted to the service multiplexer is not a TS packet format, the present invention encapsulates the mobile service data to a TS packet format and then transmits the encapsulated data to the transmitter, thereby enabling the data to maintain backward compatibility with the convention digital broadcasting system. Finally, the present invention is even more effective when applied to mobile and portable receivers, which are also liable to a frequent change in channel and which require protection (or resistance) against intense noise.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A digital broadcast transmitter for processing mobile service data, the digital broadcast transmitter comprising:
a deinterleaver configured to deinterleave mobile service data to output a first data group, the first data croup including the deinterleaved mobile service data;
a packet formatter configured to output transport stream (TS) packets including the deinterleaved mobile service data in the first data group, wherein each of the TS packets has a length of 207 bytes; and
a data interleaver configured to interleave data of the TS packets to output a second data group, wherein the second data group includes a plurality of segments, an Nth segment in the second data group having M mobile service data bytes, an (N+1)th segment in the second data group having L mobile service data bytes, an (N+2)th segment in the second data group having K mobile service data bytes, a Pth segment in the second data group having Q mobile service data bytes, a (P+1)th segment in the second data group having R mobile service data bytes, and a (P+2)th segment in the second data group having S mobile service data bytes,
wherein M<L<K,
wherein S<R<Q,
wherein N, K, L, M, P, S, R and Q are natural numbers,
wherein P>N.

2. The digital broadcast transmitter of claim 1, wherein the second data group further includes signaling information.

3. The digital broadcast transmitter of claim 2, wherein the signaling information includes transmission parameter channel (TPC) data.

4. The digital broadcast transmitter of claim 1, wherein the second data group is divided into at least three regions.

5. A method of processing mobile service data in a digital broadcast transmitter, the method comprising:
deinterleaving, by a deinterleaver, mobile service data to output a first data group, the first data group including the deinterleaved mobile service data;
outputting, by a packet formatter, transport stream (TS) packets including the deinterleaved mobile service data in the first data group, wherein each of the TS packets has a length of 207 bytes; and
interleaving, by a data interleaver, data of the TS packets to output a second data group, wherein the second data group includes a plurality of segments, an Nth segment in the second data group having M mobile service data bytes, an (N+1)th segment in the second data group having L mobile service data bytes, an (N+2)th segment in the second data group having K mobile service data bytes, a Pth segment in the second data group having Q mobile service data bytes, a (P+1)th segment in the second data group having R mobile service data bytes, and a (P+2)th segment in the second data group having S mobile service data bytes,
wherein M<L<K,
wherein S<R<Q,
wherein N, K, L, M, P, S, R and Q are natural numbers, and
wherein P>N.

6. The method of claim 5, wherein the second data group further includes signaling information.

7. The method of claim 6, wherein the signaling information includes transmission parameter channel (TPC) data.

8. The method of claim 5, wherein the second data group is divided into at least three regions.

* * * * *